(12) United States Patent
Doddavula et al.

(10) Patent No.: US 9,886,248 B2
(45) Date of Patent: Feb. 6, 2018

(54) METHOD FOR CREATING SOFTWARE FACTORY FOR DEVELOPING J2EE APPLICATIONS

(71) Applicant: Infosys Limited, Bangalore, Karnataka (IN)

(72) Inventors: Shyam Kumar Doddavula, Bangalore (IN); Suryakant Routray, Choudwar (IN); Abhishek Pratap Singh, Ajmer (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 14/667,065

(22) Filed: Mar. 24, 2015

(65) Prior Publication Data
US 2015/0199184 A1    Jul. 16, 2015

Related U.S. Application Data

(62) Division of application No. 12/652,211, filed on Jan. 5, 2010, now abandoned.

(51) Int. Cl.
*G06F 9/44* (2006.01)
(52) U.S. Cl.
CPC . *G06F 8/38* (2013.01); *G06F 8/36* (2013.01)
(58) Field of Classification Search
CPC ............... G06F 8/38; G06F 8/36; G06F 8/10
USPC ................................ 717/104, 108, 123, 124
See application file for complete search history.

(56) References Cited

U.S. PATENT DOCUMENTS

| | | | |
|---|---|---|---|
| 6,742,175 B1 | 5/2004 | Brassard | |
| 7,080,350 B2 | 7/2006 | Saimi et al. | |
| 7,316,003 B1 | 1/2008 | Dulepet et al. | |
| 7,640,533 B1 * | 12/2009 | Lottero | G06F 8/10 |
| | | | 717/108 |
| 7,665,086 B2 | 2/2010 | Cope et al. | |
| 8,291,378 B2 | 10/2012 | Arnold et al. | |
| 2004/0046789 A1 * | 3/2004 | Inanoria | 345/748 |
| 2009/0100406 A1 * | 4/2009 | Greenfield | G06F 8/20 |
| | | | 717/104 |

OTHER PUBLICATIONS

Greenfield et al., "Software Factories Assembling Applications with Patterns, Models, Frameworks and Tools", OOPSLA '03, pp. 16-27, 2003, ACM.*

(Continued)

*Primary Examiner* — Md. I Uddin
(74) *Attorney, Agent, or Firm* — Klarquist Sparkman, LLP

(57) ABSTRACT

Methods for creating a factory, such as a software factory, a user experience factory, and a persistence factory, for developing one or more Java 2 Platform, Enterprise Edition (J2EE) applications. One or more artifacts related to the J2EE applications, such as code components, workflow scripts, and build scripts, are identified. Further, one or more templates are created for generating the one or more artifacts. The templates may be created based on a predefined architecture and coding conventions. These templates are stored in a repository to enable their subsequent reuse. Thereafter, one or more relationships between the artifacts are defined in a factory schema. Subsequently, the factory is created using the factory schema and the templates. The factory thus created may be used to develop the J2EE applications.

20 Claims, 24 Drawing Sheets

(56) References Cited

OTHER PUBLICATIONS

Title: Orade® Application Development Framework, Date: Jun. 2006, pp. 4-28 to 4-35.*
Author: Jack Greenfield; Title: Software Factories: Assembling Applications with Patterns, Models, Frameworks, and Tools; Date: Nov. 2004; pp. 1-12.*
Atlintas et al., "Integrating a Software Product Line with Rule-Based Business Process Modeling," TEAA 2005, LNCS 3888, pp. 15-28, 2006, Springer-Verlag Berlin Heidelberg.
Bettin, "Model-Driven Software Development Activities: The Process View of an MDSD Project," Version 0.1, May 2004, SoftMetaWare Ltd.
Greenfield, et al., "Software Factories Assembling Applications with Patterns, Models, Frameworks and Tools," OOPSLA '03, pp. 16-27, 2003, ACM.
Haumer, "Eclipse Process Framework Composer," Part 1: Key Concepts, Second Revision, pp. 1-25, Apr. 2007.

\* cited by examiner

FIG. 9

```
@Application customerApp package = com.setlabs.infy.onetcompany {
    entity CustomerOrder Table = CUSTOMER_ORDER {
        PrimaryKeyAttribute String orderId column = ORDER_ID columnType = VARCHAR
        String orderItem column = ORDER_ITEM columnType = VARCHAR
        String shippingAddress column = Shipping_Address columnType = VARCHAR
        String productId column = PRODUCT_ID columnType = VARCHAR
    } entity Customer Table = CUSTOMER_DETAILS {
        PrimaryKeyAttribute String customerId column = CUSTOMER_ID columnType = VARCHAR
        String customerName column = Customer_name columnType = VARCHAR
        int contactNo column = Contact_No columnType = INTEGER
        String street1 column = Street1 columnType = VARCHAR
        String street2 column = Street2 columnType = VARCHAR
        String city column = CITY columnType = VARCHAR
        String state column = STATE columnType = VARCHAR
        int pin column = PIN columnType = INTEGER
        String premiumMember column = PREMIUMMEMBER columnType = VARCHAR
        entity_ref one_to_many List<CustomerOrder> customerOrderList cascade = CASCADE.ALL
            ForeignKeyAttribute customerId column = CUSTOMER_ID
    }

@Deployment {
        moduleName = "customerApp"
        jndiName = ""
        schema = ""
        userName = "root"
        password = "NO"
        url = "jdbc:mysql://localhost:3306/customerApp"
        driver = "com.mysql.jdbc.Driver"
    }
}
```

FIG. 20

METHOD FOR CREATING SOFTWARE FACTORY FOR DEVELOPING J2EE APPLICATIONS

CROSS-REFERENCE TO RELATED APPLICATIONS

The present application is a divisional of U.S. patent application Ser. No. 12/652,211, filed on Jan. 5, 2010, and claims priority from Indian Patent Application No. 46/CHE/2009 filed Jan. 7, 2009, all of which are hereby incorporated herein by reference.

BACKGROUND OF THE INVENTION

The present invention relates to the development of Java 2 Platform, Enterprise Edition (J2EE) applications. In particular, the present invention relates to a method for creating a software factory for developing one or more J2EE applications.

Presently, most J2EE applications are developed from scratch by one or more application developers. Some techniques, such as design patterns and code generation tools, enable the application developers to develop the J2EE applications based on a set of defined relationships and interactions between classes and objects. Thus, these techniques enable reuse of predefined frameworks and components to generate layers of the J2EE applications, such as a user interface layer or a persistence layer. However, development of the J2EE applications using these techniques may consume a considerable amount of time. Further, these techniques present a lack of flexibility to the application developers in terms of generation and presentation of the layers of the J2EE applications. In other words, the J2EE application layers are generated according to a specified pattern and subsequently need to be customized by the application developers. For example, some techniques enable generation of code stubs while the implementation details need to be coded by the application developers to generate the user interface layer of the J2EE applications.

In light of the discussion above, there is a need for a software factory for developing J2EE applications. Further, there is a need to enable integration and reuse of all artifacts involved in the development of the J2EE applications through the use of component repositories. Also, there is a need to develop one or more user interfaces of the J2EE applications by using reusable repositories of web artifacts such as user interface components, layouts, and themes. In addition, there is a need to automate generation of a persistence layer for the J2EE applications by using predefined templates for creating one or more artifacts to generate the persistence layer.

BRIEF SUMMARY OF THE INVENTION

To overcome the limitations described above, the invention describes a method for creating a software factory for developing one or more Java 2 Platform, Enterprise Edition (J2EE) applications. One or more artifacts related to the J2EE applications are identified. The one or more artifacts may include code components, test scripts, and deployment configurations. One or more templates are created for generating the one or more artifacts. The one or more templates may be created based on a predefined architecture and coding conventions. The templates are then stored in a repository to enable their subsequent reuse. Thereafter, one or more relationships between the artifacts are defined in a software factory schema. Subsequently, the software factory is created using the software factory schema and the templates.

The software factory may be used for developing the J2EE applications using the templates. One or more application developers may define an integration mechanism for integrating the artifacts generated by the templates. The application developers may also define framework-specific details corresponding to the framework of the J2EE applications.

The invention further describes a method for creating a user experience factory for developing one or more user interfaces for the J2EE applications. One or more user experience components are identified. For example, the user experience components may include textboxes, radio buttons, tables and login components. Thereafter, one or more user interface templates are created for generating the user experience components. The user interface templates are then stored in the repository such that they may be reused at a later stage. In an embodiment of the invention, the user experience components may also be stored in the repository to enable their subsequent reuse. Thereafter, one or more relationships between the user experience components are defined in a user experience factory schema. Subsequently, the user experience software factory is created using the user experience factory schema and the user interface templates.

The invention also describes a method for creating a persistence factory for developing a persistence layer for the J2EE applications. The method includes identifying one or more database entities for defining the persistence layer. One or more metadata attributes may also be defined for the database entities. Further, one or more relationships may be defined between the database entities in an entity relationship model. Thereafter, an object-relational mapping is defined between the database entities and one or more database objects of a database. One or more persistence templates are also created for generating one or more artifacts for developing the persistence layer. The artifacts may include one or more configuration files, unit test scripts, build files and XML files for generating the persistence layer. The persistence templates are then stored in the repository to enable their subsequent reuse. Subsequently, a persistence factory is created using the persistence templates, the database entities, and the object-relational mapping.

The artifacts for developing the J2EE applications are identified by the application developers and may be generated by using the templates stored in the repository. The generated artifacts may include one or more build scripts and deployment configuration files. Since the application developers are not required to develop the J2EE applications from scratch, a significant amount of time and effort is saved. Further, integration mechanisms for integrating the artifacts may also be defined by the application developers. This enables integration of the various aspects of the J2EE applications.

BRIEF DESCRIPTION OF THE DRAWINGS

The various embodiments of the invention will hereinafter be described in conjunction with the appended drawings, provided to illustrate and not to limit the invention, wherein like designations denote like elements, and in which:

FIG. 9 is a screenshot of a user interface of a system for providing a set of dynamic information corresponding to a first user interface component using the user experience factory, in accordance with an exemplary embodiment of the invention;

FIG. 20 is a screenshot of an Integrated Development Environment (IDE) including an exemplary DSL file, in accordance with an embodiment of the invention;

DETAILED DESCRIPTION

Figure 1:
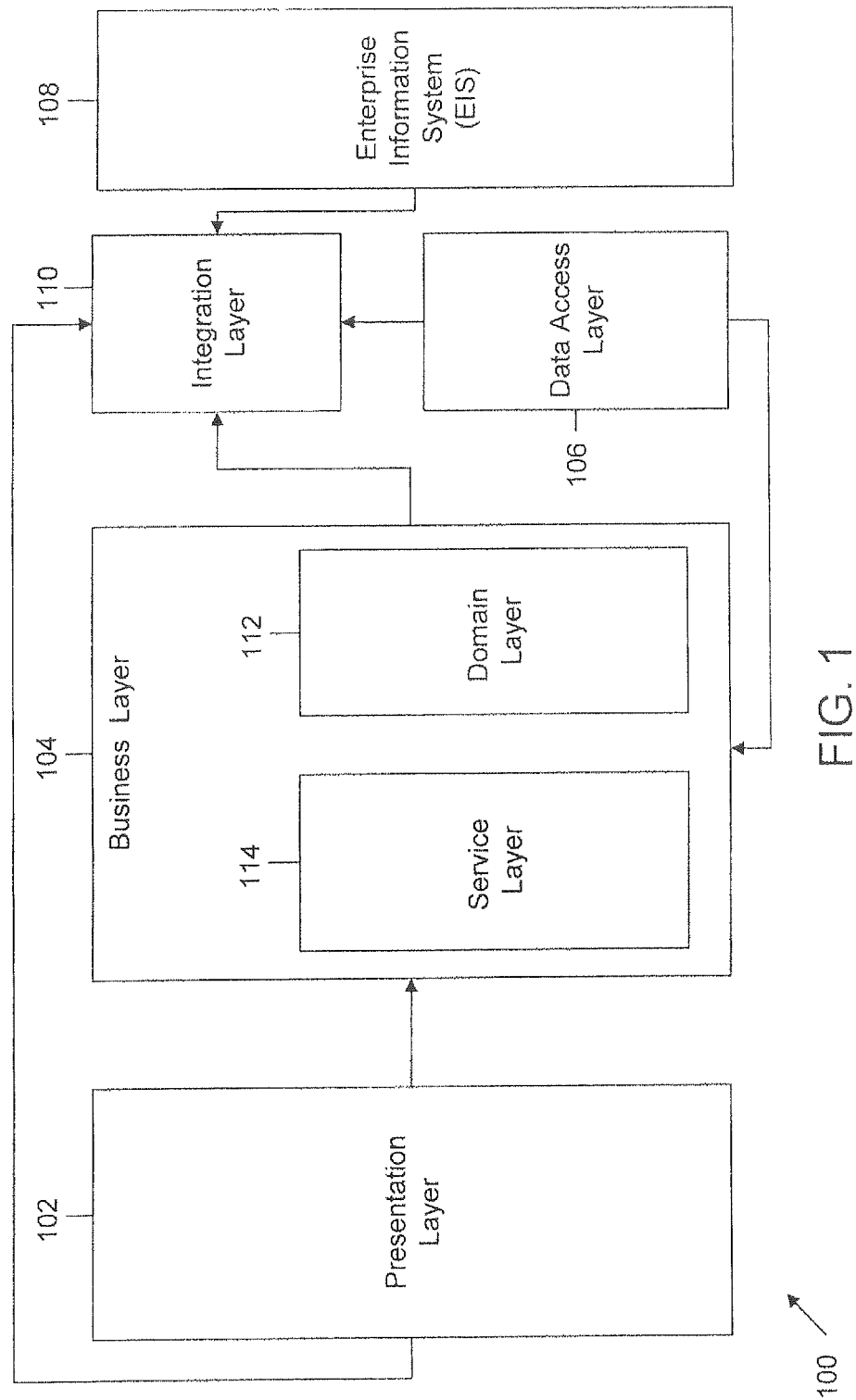
FIG. 1 illustrates a Java 2 Platform, Enterprise Edition (J2EE) environment as is known in the art.

It is to be understood that the invention is not limited in its application to the details of components set forth in the following description or as illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Furthermore, as described in the subsequent paragraphs, the specific details illustrated in the drawings are intended to exemplify the embodiments of the invention and that other alternative methods of implementation of the invention are possible.

The invention describes a method for creating a software factory for developing one or more Java 2 Platform, Enterprise Edition (J2EE) applications. One or more artifacts related to the J2EE applications are identified. The artifacts may include code components, build scripts, and deployment configuration files. Further, one or more templates are created for generating the one or more artifacts. The one or more templates are stored in a repository to enable their subsequent reuse. Thereafter, one or more relationships between the artifacts are defined in a software factory schema. Subsequently, the software factory is created using the software factory schema and the templates.

The invention further describes a method for creating a user experience factory for developing one or more user interfaces for the J2EE applications. One or more user experience components, such as textboxes and radio buttons, user interface layouts and flows, and configuration files, are identified for generating the user interfaces. Further, one or more user interface templates are created for generating the one or more user experience components. The user interface templates may be created based on a predefined architecture and coding conventions. The user interface templates are then stored in a repository to enable subsequent reuse. Thereafter, one or more relationships between the user experience components are defined in a user experience factory schema. Subsequently, the user experience software factory is created using the user experience factory schema and the user interface templates.

The invention also describes a method for creating a persistence factory for developing a persistence layer for the J2EE applications. One or more database entities for defining the persistence layer are identified. Further, one or more metadata attributes are defined corresponding to the database entities. For example, if an entity is defined as 'Customer', the metadata attributes corresponding to the entity may be defined as 'Customer Name' and 'Customer Identification Number'. One or more relationships between the database entities are then defined in an entity relationship model. The relationships between the database entities may be defined in terms of connectivity such as a one-to-many relationship, many-to-one relationship, and so on. Further, an object-relational mapping is defined between the database entities and one or more database objects of a database. One or more persistence templates are also created for generating one or more artifacts for developing the persistence layer. The persistence templates are then stored to enable their subsequent reuse. Thereafter, a persistence factory is created using the persistence templates, the database entities, and the object-relational mapping.

FIG. 1 illustrates a J2EE environment 100, as is known in the art. J2EE environment 100 may include a presentation layer 102, a business layer 104, a data access layer 106, an Enterprise Information System (EIS) 108, and an integration layer 110. Business Layer 104 may include a domain layer 112 and a service layer 114.

Presentation layer 102 includes one or more user interface components, such as servlets and Java Server Pages (JSP), to provide a dynamic user interface to one or more J2EE applications. Business layer 104 includes the business logic for the J2EE applications such as validations and calculations. Domain layer 112 includes a knowledge base specific to the domain of the J2EE applications. Further, service layer 114 includes one or more business entities for providing services related to domain layer 112. For example, corresponding to a J2EE application catering to an online shopping portal, domain layer 112 may include a knowledge base containing information related to one or more products. Accordingly, service layer 114 may include business entities for providing services that enable a user to purchase the products. Data access layer 106 includes one or more data access objects to enable database access to business layer 104. EIS 108 enables persistence of data in a database, typically in a relational database. Integration layer 110 includes an integration framework for integrating presentation layer 102, business layer 104, data access layer 106, and EIS 108.

In accordance with various embodiments of the invention, the user interface components may be created and subsequently integrated to generate presentation layer 102 using the user experience factory. Similarly, data access objects may be defined for creating data access layer 106 using the persistence factory. Thus, the J2EE applications may be developed faster and with reduced effort, as compared with the solutions known in the art.

Figure 2:
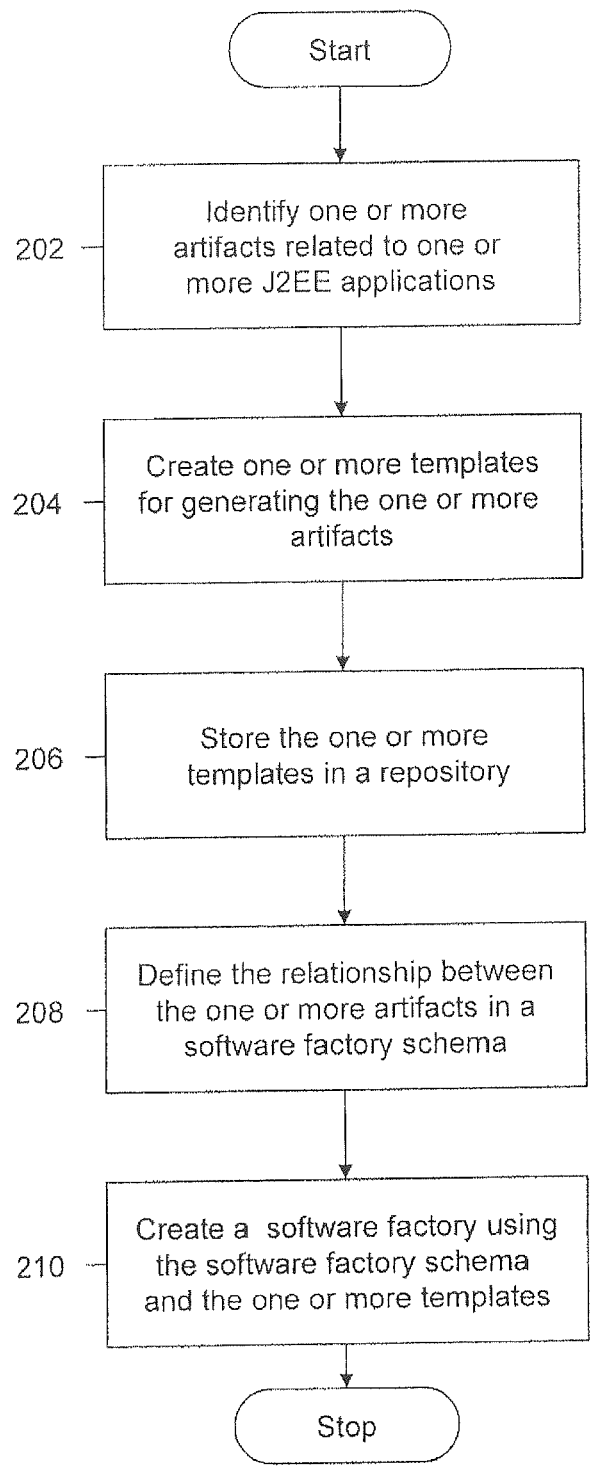
FIG. 2 illustrates a flowchart of a method for creating a software factory for developing one or more J2EE applications, in accordance with an embodiment of the invention.

FIG. 2 illustrates a flowchart of a method for creating a software factory for developing one or more J2EE applications, in accordance with an embodiment of the invention.

At 202, one or more artifacts related to the J2EE applications are identified. The one or more artifacts may include code components, source code files, build scripts, test scripts, and packaging and deployment configurations. At 204, one or more templates are created for generating the artifacts. The templates may be created based on a predefined architecture, coding conventions, and a reference implementation. At 206, the templates are stored in a repository to enable their subsequent reuse. For example, a template for generating a packaging configuration for the J2EE applications may be created. The created template may then be stored and customized before use in developing another J2EE application at a later stage.

Further, at 208, the relationship between the artifacts is defined in a software factory schema. In another embodiment of the invention, guidelines for establishing the relationships may be defined in the software factory schema. Thereafter, at 210, a software factory is created using the software factory schema and the templates.

The software factory thus created may be used for developing the J2EE applications. In an embodiment of the invention, framework-specific details corresponding to the J2EE applications may be defined by one or more application developers for developing the J2EE applications. The framework-specific details may include dynamic information specific to the framework of the J2EE applications. The application developers are required to specify the framework-specific details and the J2EE applications are developed using one or more templates stored in the repository. In various embodiments of the invention, the templates may include static information corresponding to a coding framework, for example, class and method declarations and static properties of objects. The framework-specific details specified by the application developers are merged with the static information in the templates for generating the J2EE applications. In another embodiment of the invention, the framework-specific details may be specified dynamically in the templates by the application developers. In yet another embodiment of the invention, the application developers may not be required to define the framework specific details and the J2EE applications may be developed using the templates. Therefore, the J2EE applications are developed faster with significant reduction in the effort of the application developers, as compared with the solutions known in the art.

Figure 3:
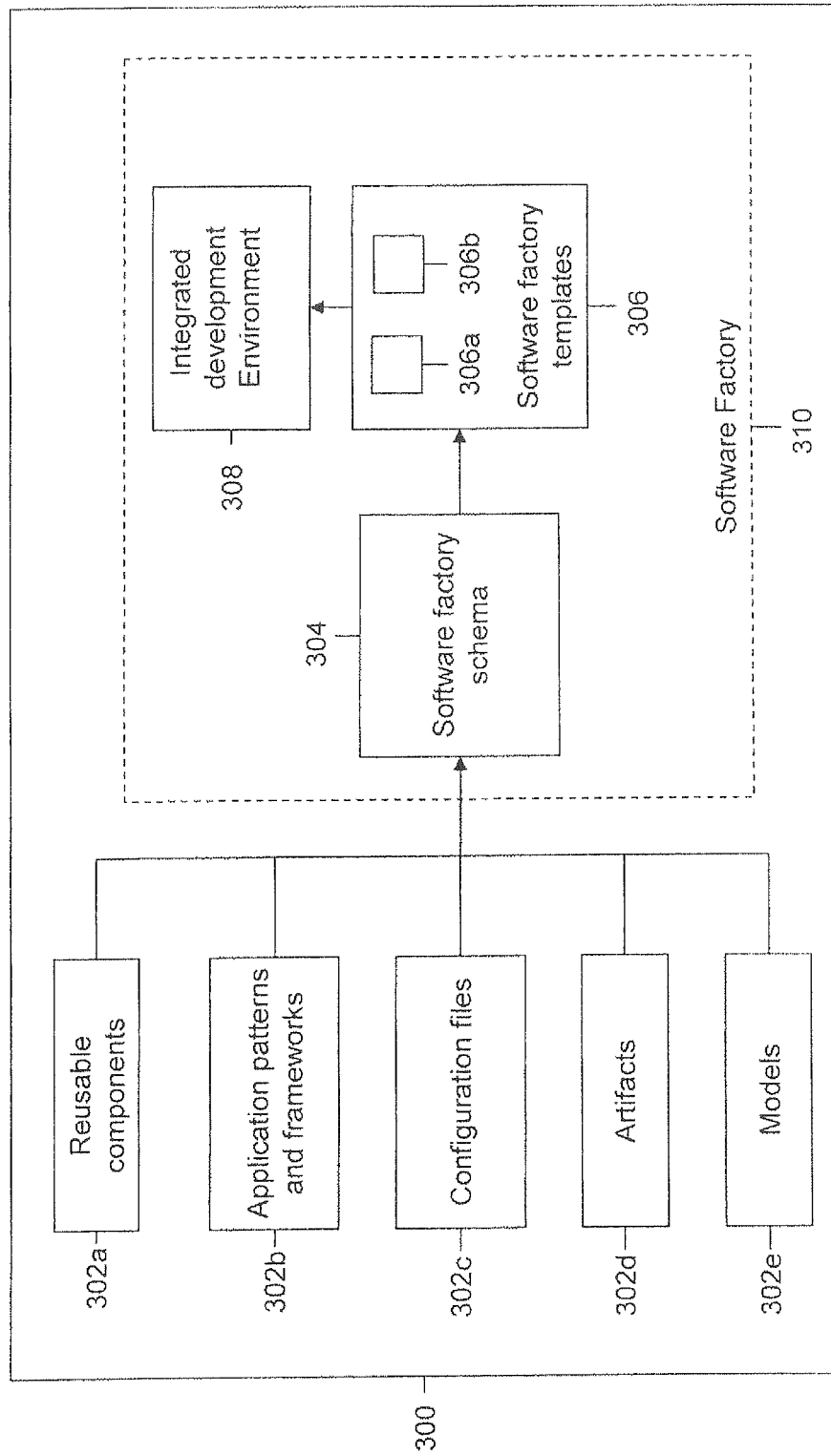
FIG. 3 is a block diagram of a system for creating a software factory for developing one or more J2EE applications, in accordance with another embodiment of the invention.

FIG. 3 is a block diagram of a system 300 for creating a software factory for developing the J2EE applications, in accordance with another embodiment of the invention. System 300 may include a plurality of software factory components such as reusable components 302a, application patterns and frameworks 302b, configuration files 302c, artifacts 302d, and models 302e, hereinafter referred to as software factory components 302; a software factory schema 304; one or more software factory templates such as software factory templates 306a and 306b, hereinafter referred to as software factory templates 306; and an Integrated Development Environment (IDE) 308.

Software factory components 302 are identified by one or more application developers for developing the J2EE applications. Reusable components 302a identified by the application developers may include user interface components such as textboxes and radio buttons. Application patterns and frameworks 302b may include application and design patterns that enable development of the J2EE applications based on a predefined framework. Configuration files 302c may include one or more deployment and packaging configuration files. Artifacts 302d may include one or more artifacts required to develop the J2EE applications such as code components, source code files, and build scripts. In another embodiment of the invention, artifacts 302d may include reusable components 302a or configuration files 302c. Models 302e may include an entity relationship model containing the relationship between one or more database entities.

Further, software factory components 302 and one or more relationships between software factory components 302 are defined in software factory schema 304. Software factory templates 306 are then created for generating software factory components 302. Software factory templates 306 may be created based on predefined patterns, frameworks, coding conventions, style sheets, and custom tools.

A software factory 310 is created using software schema 304 and software factory templates 306. Subsequently, software factory 310 is integrated in IDE 308. In an embodiment of the invention, IDE 308 may be Eclipse™ IDE.

One or more application developers may use software factory 310 integrated in IDE 308 for developing the J2EE applications. The application developers may customize software factory schema 304 and software factory templates 306, according to the specific architecture of the J2EE applications before using software factory templates 306 for generating software factory components 302.

In case a software factory template for generating the J2EE applications does not exist in software factory templates 306, a new software factory template may be created. The newly created software factory template may then be stored in the repository to enable its subsequent reuse. An integration mechanism may also be defined by the application developers for integrating software factory components 302 for developing the J2EE applications. For example, the integration mechanism may include enabling the processing logic in one or more test scripts to invoke the user interface components for testing the functionality of the J2EE applications.

Therefore, the application developers are required to identify software factory components 302 for developing the J2EE applications that may then be generated by using software factory templates 306. Since the application developers need not develop the J2EE applications from scratch, a significant amount of time and effort is reduced which may in turn increase the productivity. Also, in case of development of similar J2EE applications, redundancy of work is reduced. Further, the application developers may define an integration mechanism for integrating various aspects of the J2EE applications.

Figure 4:
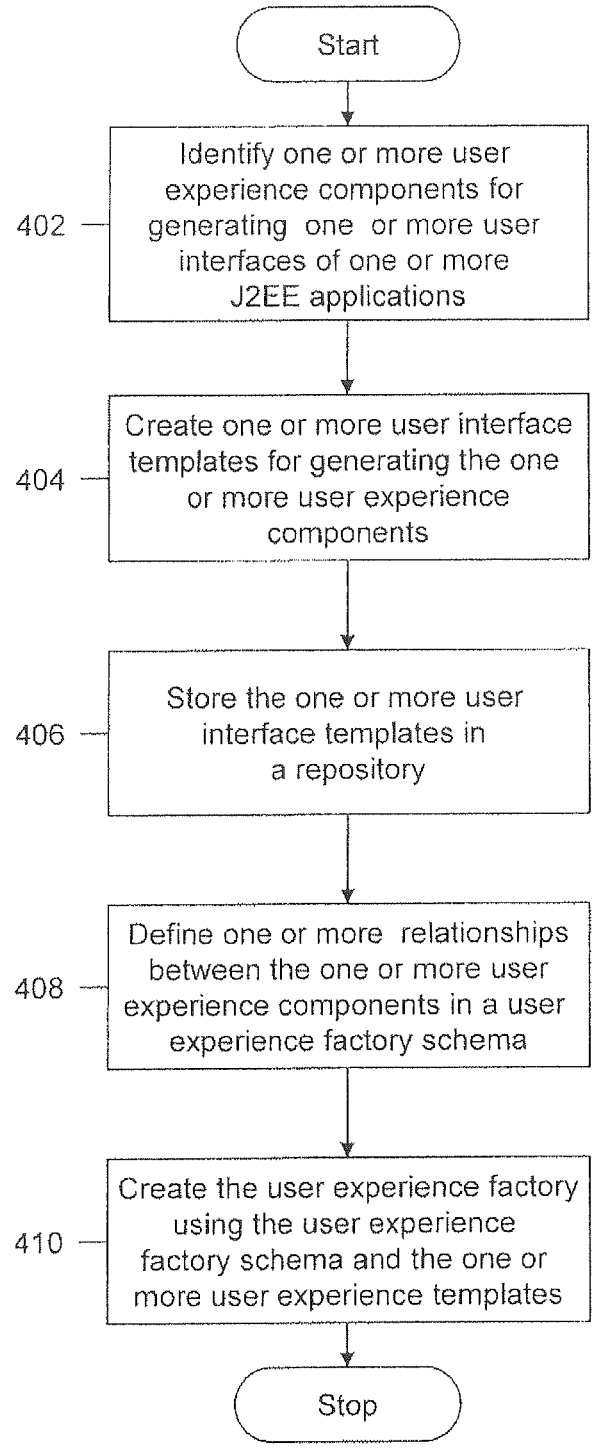
FIG. 4 illustrates a flowchart of a method for creating a user experience factory for developing one or more user interfaces of one or more J2EE applications, in accordance with yet another embodiment of the invention.

FIG. 4 illustrates a flowchart of a method for creating a user experience factory for developing one or more user interfaces of the J2EE applications, in accordance with yet another embodiment of the invention.

At 402, one or more user experience components for generating the user interfaces are identified. For example, the user experience components may include textboxes, radio buttons, source code files, page and layout components, and workflow scripts. At 404, one or more user interface templates are created for generating the user experience components. At 406, the user interface templates are stored in a repository such that they may be reused at a later stage. In another embodiment of the invention, the user experience components may also be stored in the repository. At 408, one or more relationships between the user experience components are defined by one or more application developers in a user experience factory schema. For example, a relationship between a user interface component such as a table and its corresponding backing bean may be defined by an application developer. Subsequently, at 410, a user experience factory is created using the user experience factory schema and the user interface templates. The user experience factory thus created may be used by the application developers for developing the user interfaces of the J2EE applications.

Figure 5:
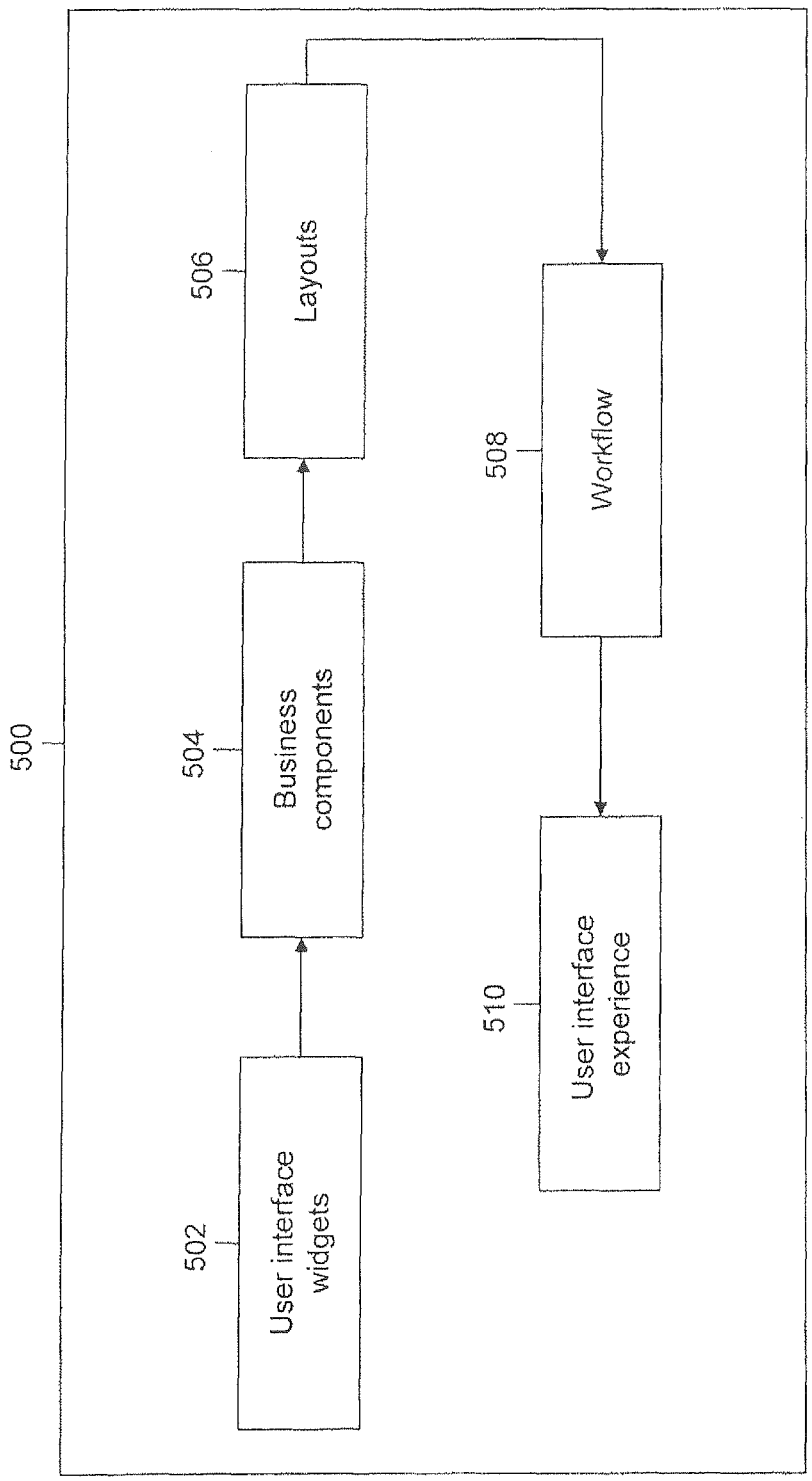
FIG. 5 illustrates a plurality of elements of a user experience factory, in accordance with still another embodiment of the invention.

FIG. 5 illustrates a plurality of elements of a user experience factory 500, in accordance with still another embodiment of the invention. User experience factory 500 includes a plurality of user interface widgets 502, a plurality of business components 504, a plurality of layouts 506, a plurality of workflows 508, and a user interface experience 510.

User interface widgets 502 may include one or more user interface components such as a textbox, a combo-box, and a table. One or more user interface widgets from user interface widgets 502 are provided as an input to form business components 504. For example, a plurality of user interface widgets, such as a combo-box and a table, may be integrated to form a business component such as a mailbox. Business components 504 are then integrated to form layouts 506. Layouts 506 may include one or more page layouts such as a login page, a mailbox view page, and an error page. Layouts 506 are then integrated to generate workflows 508 to enable user navigation of the J2EE applications. Subsequently, workflows 508 may be integrated to generate user interface experience 510.

Each element of user experience factory 500 may be created using one or more user interface templates. Thus, each element may be reused for developing a plurality of J2EE applications.

Figure 6A:
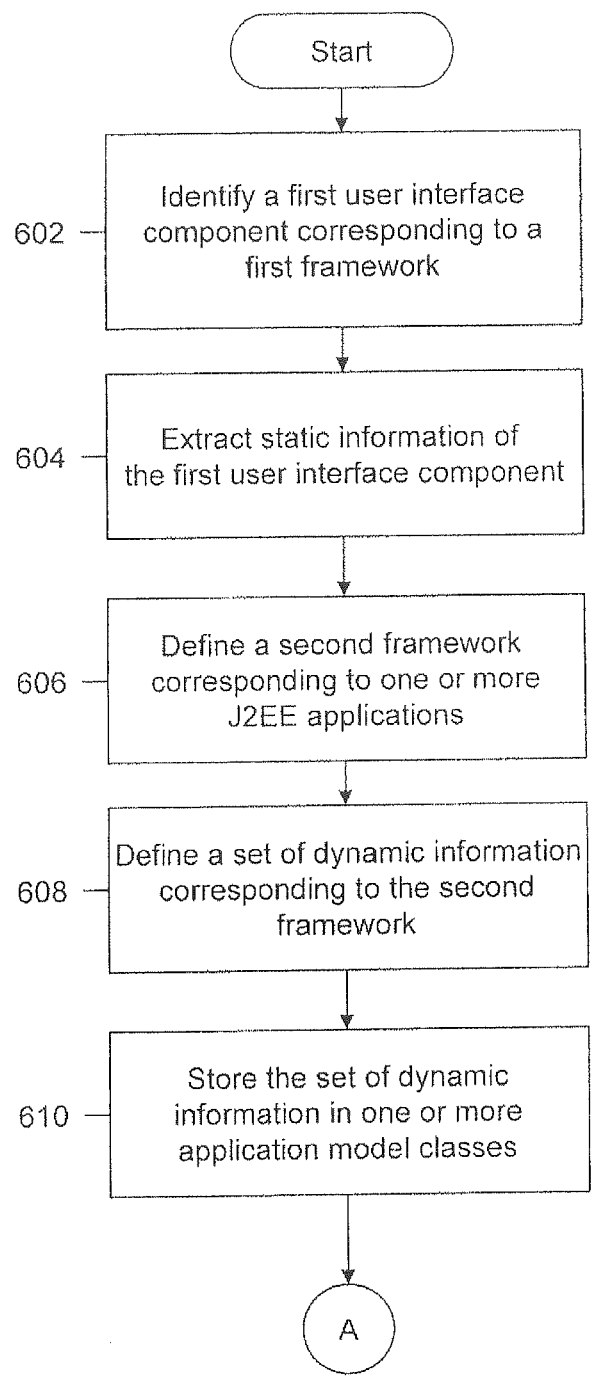
FIG. 6A and FIG. 6B illustrate a flowchart of a method for developing one or more J2EE applications using a user experience factory, in accordance with an embodiment of the invention.
Figure 6B:
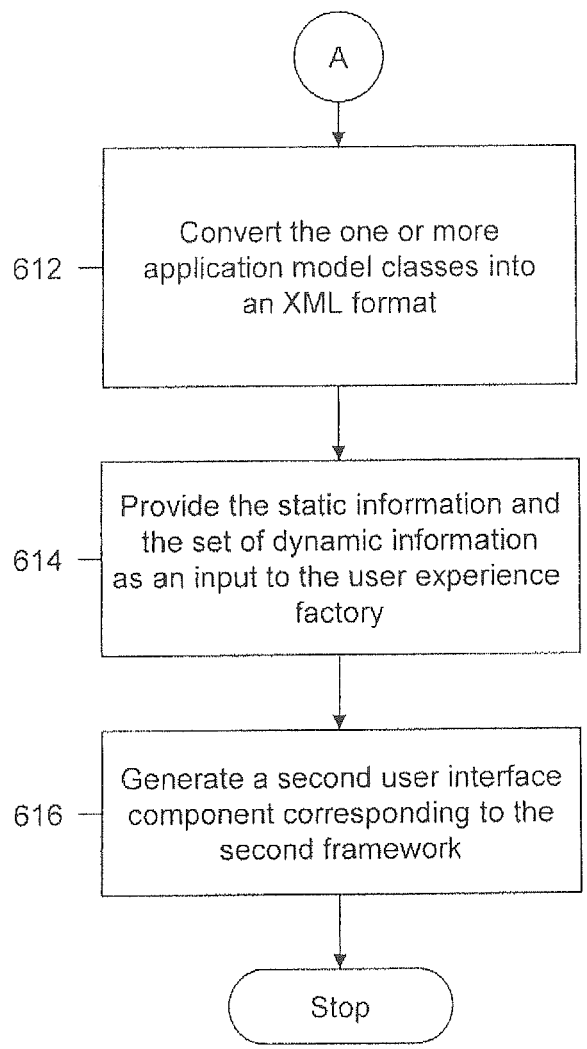

FIG. 6A and FIG. 6B illustrate a flowchart of a method for developing the J2EE applications using a user experience factory such as user experience factory 500, in accordance with an embodiment of the invention.

At 602, a first user interface component, such as a user interface widget, from user interface widgets 502, corresponding to a first framework is identified. The identified first user interface component is then provided as an input to the user interface templates. For example, a textbox corresponding to a Hyper Text Markup Language (HTML) framework may be identified. At 604, static information of the first user interface component is extracted and stored. At 606, a second framework corresponding to the J2EE applications is defined. The second framework may include frameworks such as Java Server Faces (JSF), Struts, and Ice-Faces. Further, at 608, a set of dynamic information corresponding to the second framework may be defined. The set of dynamic information may include attribute IDs and corresponding attribute values specific to the second framework. For example, for an HTML user interface component, such as a textbox, a second framework may be defined as JSF. Static information, for example, a name of the textbox, size of the textbox, and the like, is extracted from the textbox. Further, attributes such as 'jsfid', 'component type' and 'backing bean value' may be defined corresponding to the JSF framework. The set of dynamic information for the JSF framework may include details of one or more managed beans corresponding to the user interface components.

At 610, the set of dynamic information is stored in one or more application model classes. At 612, the one or more application model classes are converted into one or more Extensible Markup Language (XML) files. Thereafter, at 614, the static information and the XML files including the set of dynamic information is provided as an input to the user experience templates. Subsequently, at 616, a second user interface component corresponding to the second framework is generated by the user experience templates. In an embodiment of the invention, the second user interface component may be stored in the repository to enable its subsequent reuse.

Thus, a first user interface component, for example, an HTML component, may be converted into the corresponding user interface component of the second framework such as a JSF component. Since the application developers provide the first user interface component and the set of dynamic information as an input, one or more second user interface components and subsequently the user interfaces of the J2EE applications may be generated with reduced effort.

In an embodiment of the invention wherein the second user interface components are stored in the repository, the J2EE applications may be developed using the set of dynamic information, one or more user experience templates and the second user interface components.

Figure 7:
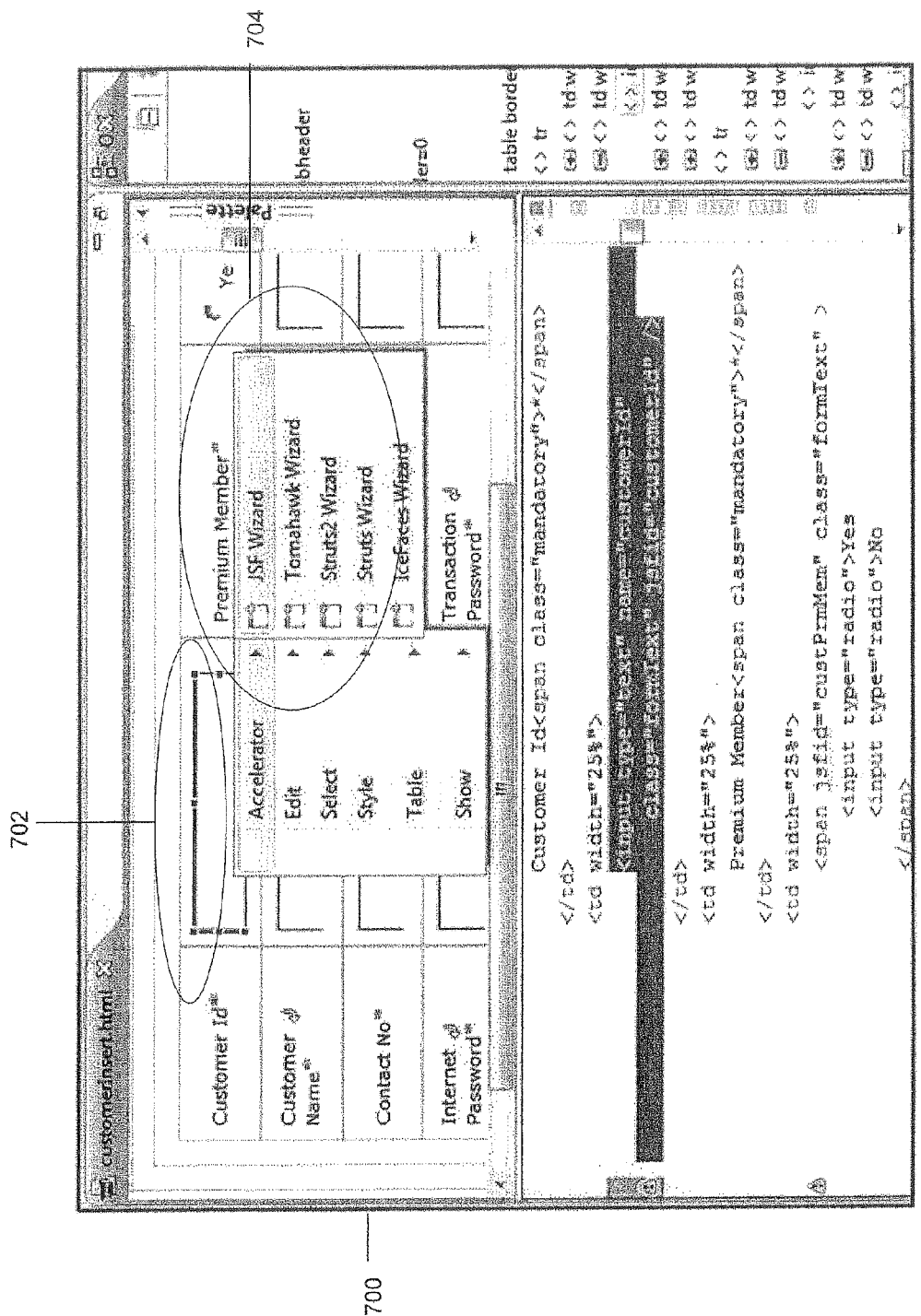
FIG. 7 is a screenshot of a user interface of a user experience factory for developing one or more user interfaces of one or more J2EE applications, in accordance with an exemplary embodiment of the invention.

FIG. 7 is a screenshot of a user interface 700 of a user experience factory, such as user experience factory 500, for developing the user interfaces of the J2EE applications, in accordance with an exemplary embodiment of the invention.

User interface 700 enables an application developer to select the first user interface component of a first framework such as an HTML framework. For example, the application developer may select the second framework corresponding to a textbox 702 from a menu bar 704. Textbox 702 is then converted into a user interface component corresponding to the second framework. Menu bar 704 may include a plurality of options for selecting the second framework such as JSF, Struts, Ice-Faces, Tomahawk, and the like.

Figure 8:
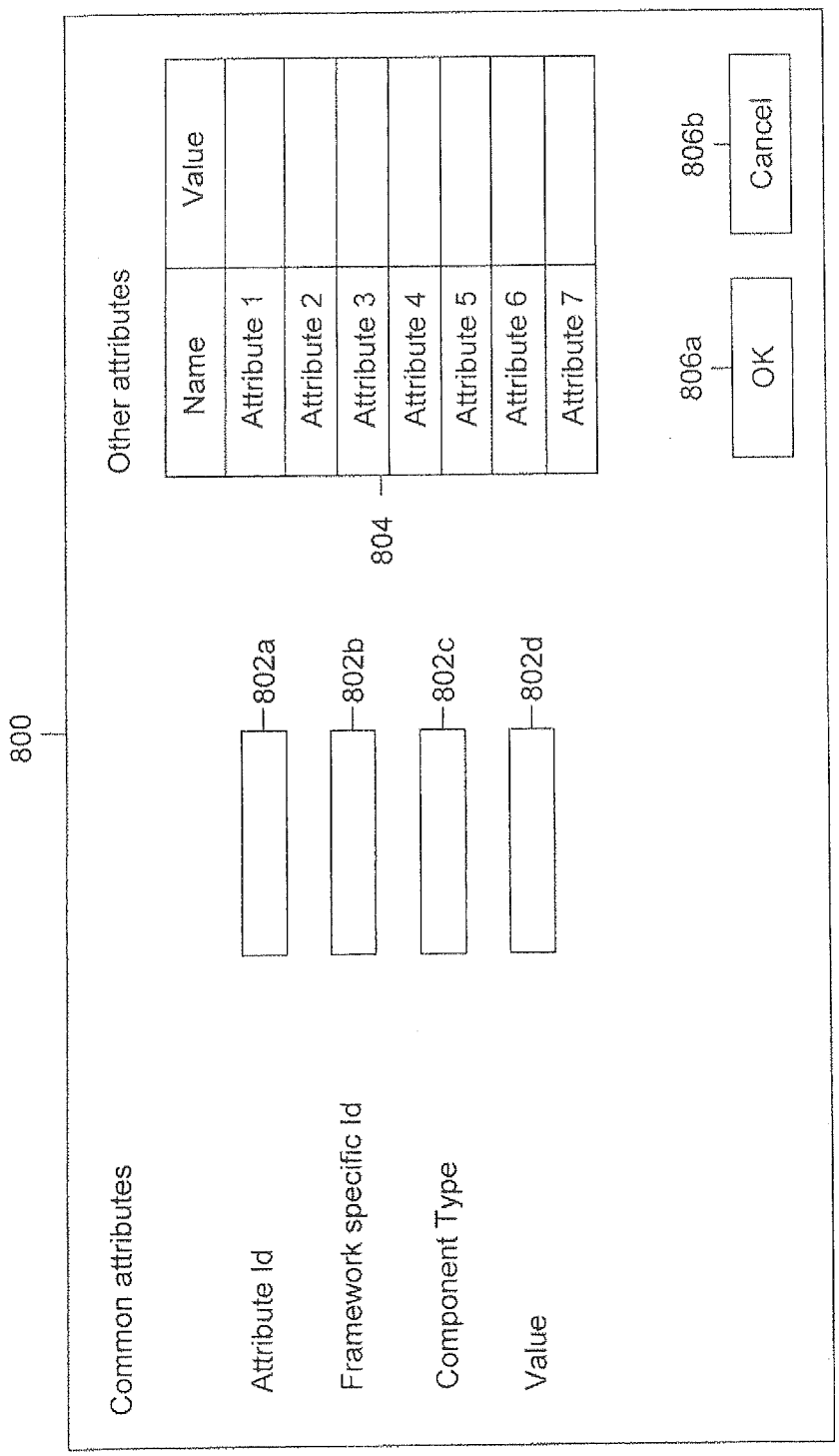
FIG. 8 is a block diagram of a system for providing a set of dynamic information corresponding to a first user interface component using the user experience factory, in accordance with an embodiment of the invention.

FIG. 8 is a block diagram of a system 800 for providing a set of dynamic information corresponding to the first user interface component, such as textbox 702, using user experience factory 500, in accordance with an embodiment of the invention. System 800 includes a plurality of textboxes such as textbox 802a, 802b, 802c, and 802d, hereinafter referred to textboxes 802; an attribute table 804; a plurality of buttons such as buttons 806a and 806b.

The values corresponding to a plurality of common attributes to be specified for each second user interface component may be entered in textboxes 802. For example, an attribute id corresponding to the first user interface component may be defined in textbox 802a. Similarly, a framework-specific id, such as a 'jsfid' for a JSF framework, may be defined in textbox 802b.

Attribute table 804 may include one or more optional attributes corresponding to the identified first user interface component. The values of the attributes may be entered by the application developers in attribute table 804. The attribute values may be saved in a repository by using button 806a.

Figure 9:
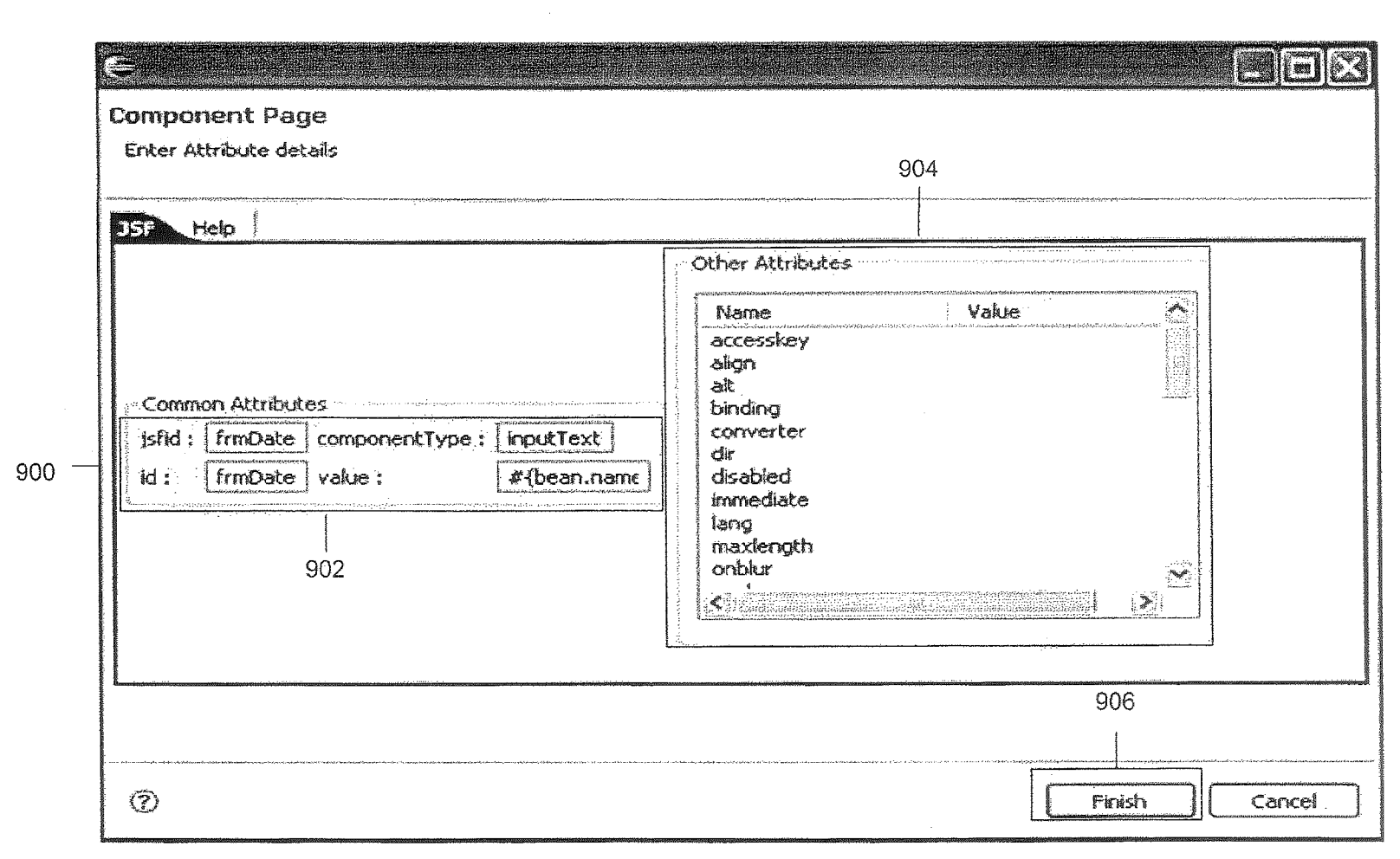

FIG. 9 is a screenshot of a user interface 900 of a system, such as system 800, for providing the set of dynamic information corresponding to the first user interface component using the user experience factory, in accordance with an exemplary embodiment of the invention.

User interface 900 includes a list of common attributes and corresponding textboxes depicted by 902. The values for the optional attributes corresponding to the identified first user interface component may be defined using an attribute table 904. Subsequently, the information entered by the application developers may be saved by clicking on a button 906.

Figure 10:
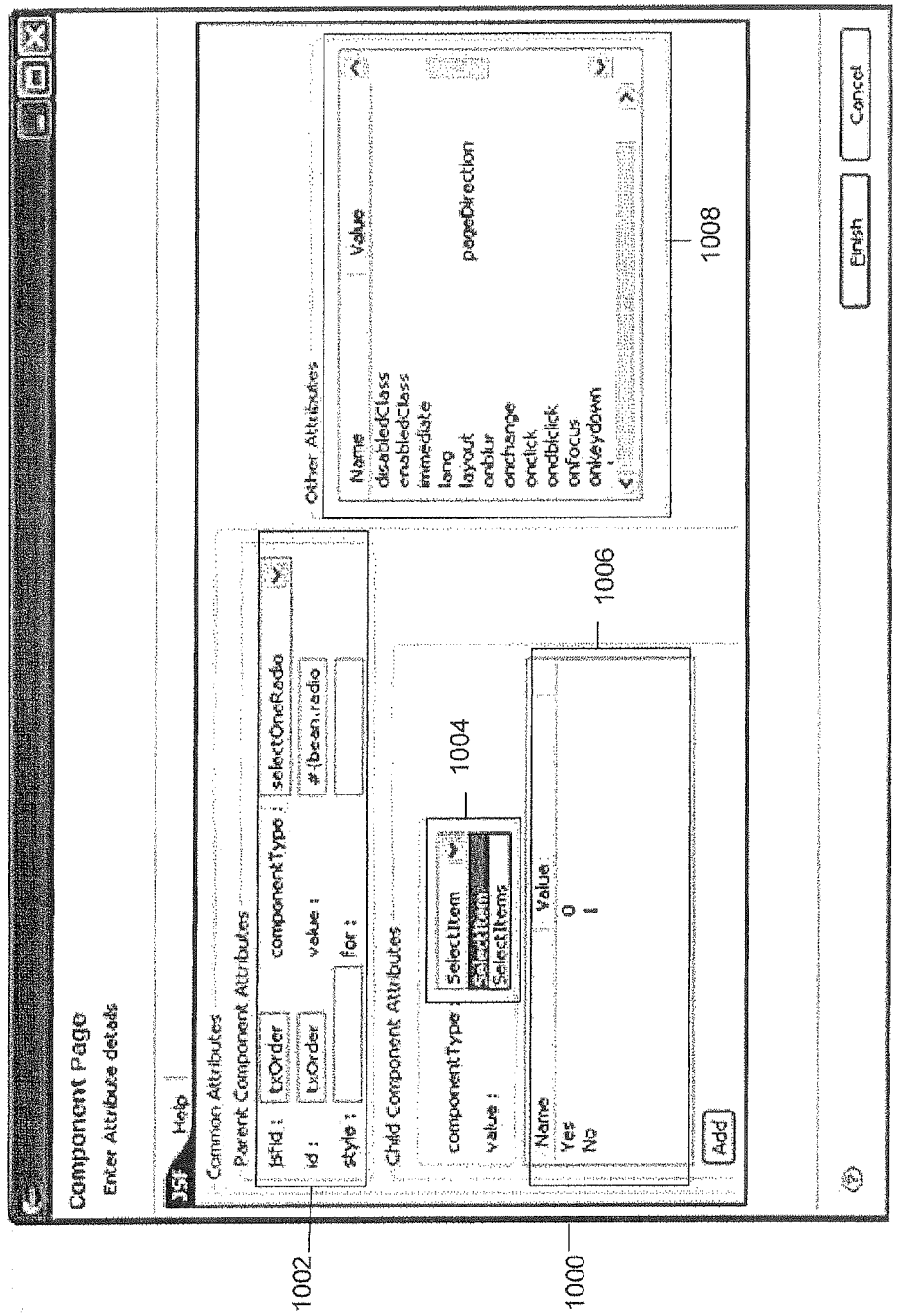
FIG. 10 is a screenshot of another user interface of the system for providing the set of dynamic information corresponding to another user interface component using the user experience factory, in accordance with the exemplary embodiment of the invention.

FIG. 10 is a screenshot of a user interface 1000 of the system, such as system 800, for providing the set of dynamic information corresponding to another first user interface component, such as a radio button, using the user experience factory, in accordance with the exemplary embodiment of the invention.

A list of common attributes and corresponding textboxes for entering the values of the common attributes is depicted by 1002. Further, a list of child component attributes and corresponding values may also be specified using a menu 1004 and a table 1006. In various embodiments of the invention, the list of child component attributes corresponding to the radio button may correspond to the data values that may be selected using the radio button. Also, values for the optional attributes corresponding to the first user component may be defined in another table 1008. For example, a value of 'Page direction' may be specified corresponding to an optional attribute 'Layout'.

Similarly, dynamic information corresponding to other first user interface components, such as a drop-down menu, a combo box, a button, and a table, may also be specified. The set of dynamic information may be persisted in a metadata XML file. Thus, a plurality of first user interface components of the first framework may be converted into one or more second user interface components of the second framework using the information in the metadata XML file.

Figure 11:
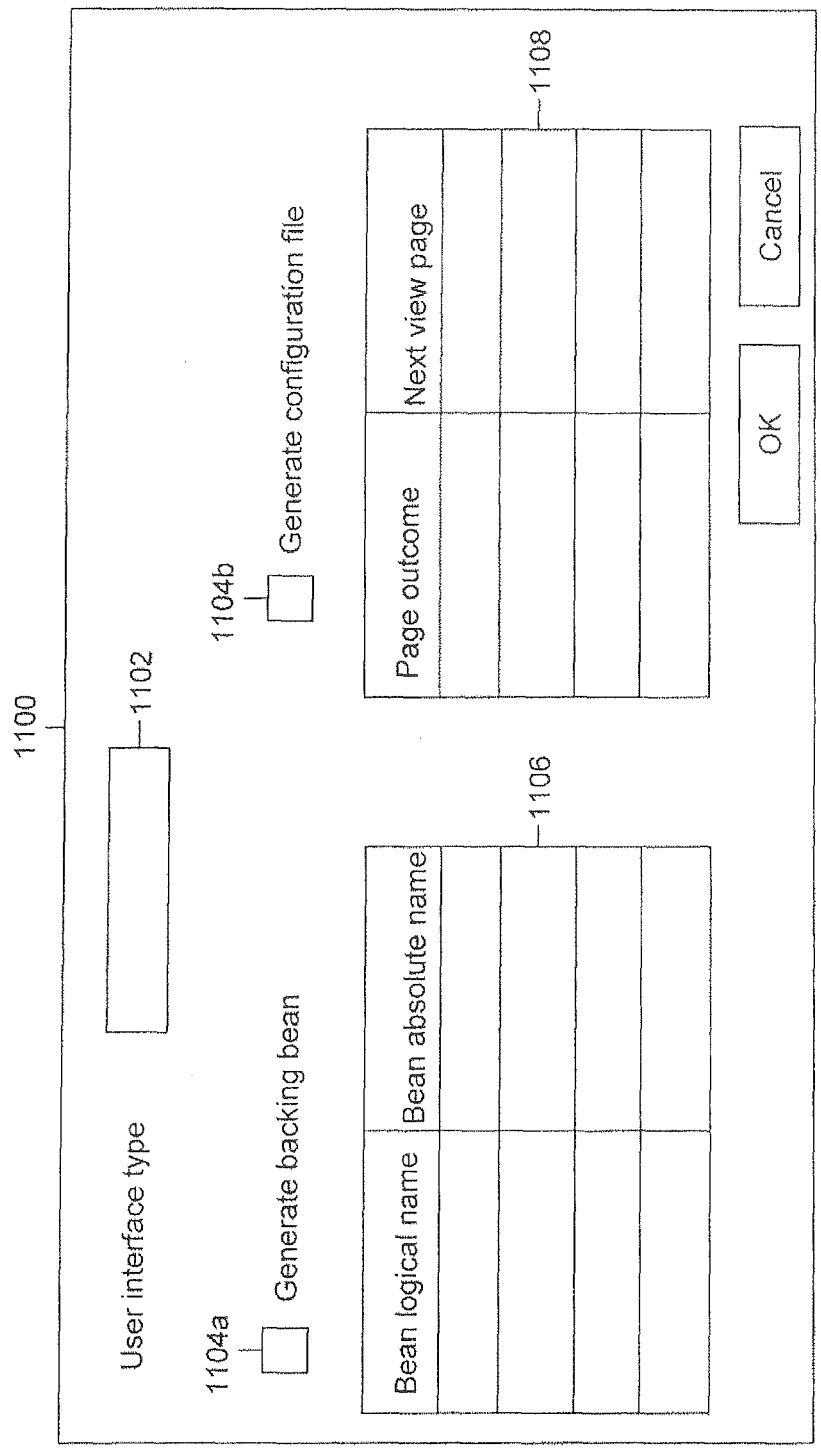
FIG. 11 is a block diagram of a system for providing configuration details for developing one or more user interfaces of one or more J2EE applications using the user experience factory, in accordance with an embodiment of the invention.

FIG. 11 is a block diagram of a system 1100 for providing configuration details for developing the user interfaces of the J2EE applications using the user experience factory, in accordance with an embodiment of the invention.

System 1100 includes a menu 1102, a plurality of checkboxes such as checkbox 1104a and checkbox 1104b, and a plurality of tables such as a table 1106 and a table 1108.

Menu 1102 enables the application developers to select a second framework for the J2EE applications. For example, the application developers may select a framework, such as JSF, Struts and ICEFaces, reflecting in menu 1102.

In case backing beans for the J2EE applications need to be generated, the application developers may check checkbox 1104a. Accordingly, the application developers may specify one or more logical names and absolute names of one or more backing beans in table 1106. Further, in case configuration files, such as workflow scripts, need to be generated, the application developers may check checkbox 1104b. The application developers may specify one or more Uniform Resource Locators (URLs) under a 'Page outcome' column and corresponding URLs under a 'Next view page' column of table 1108. The URLs listed under column 'Next view page' relate to the next pages that may be viewed by a user of the J2EE application while navigating a page corresponding to a URL listed under the 'Page outcome' column.

Figure 12:
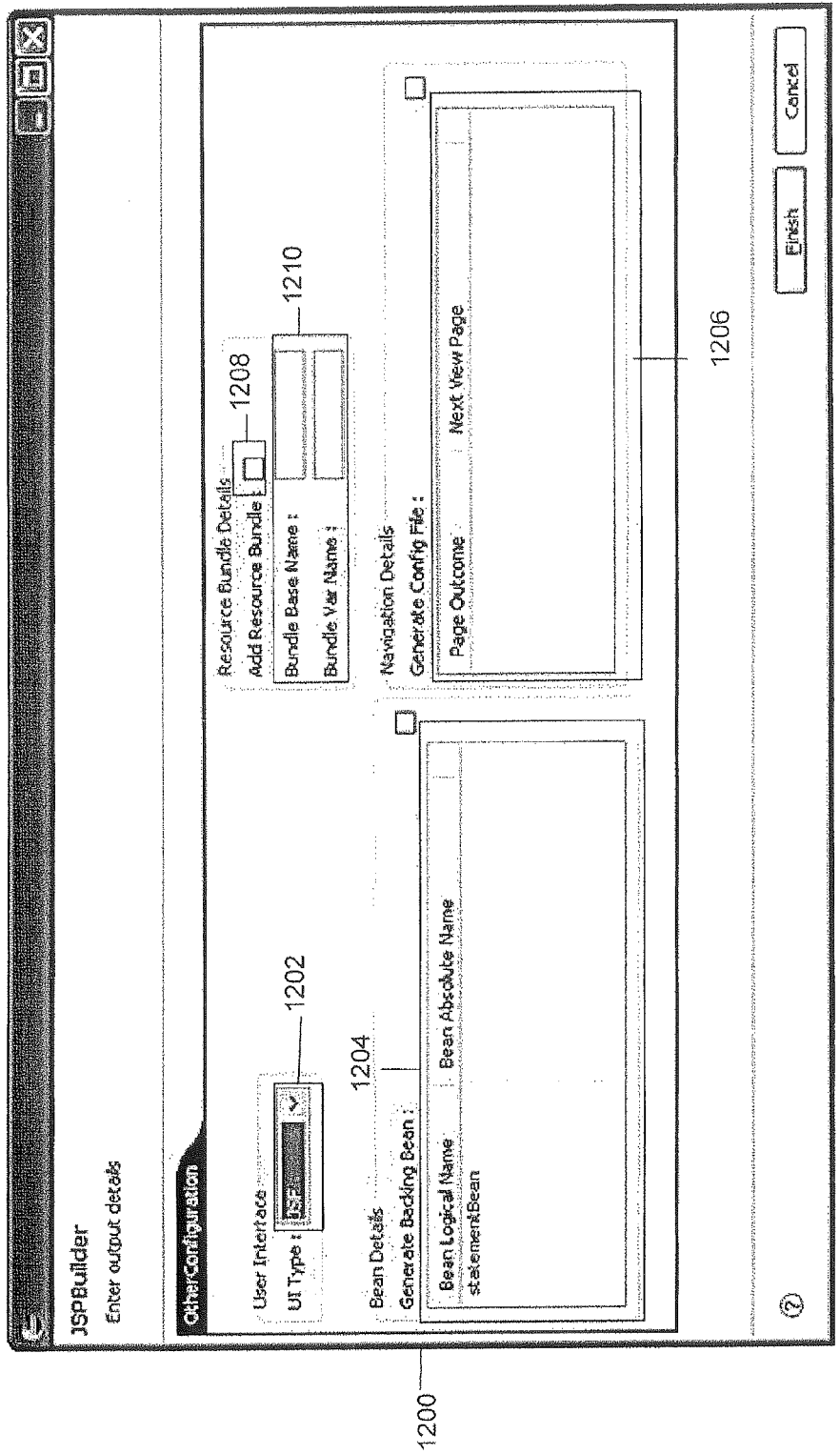
FIG. 12 is a screenshot of a user interface of the system for providing configuration details for developing the user interfaces of one or more J2EE applications using the user experience factory, in accordance with an exemplary embodiment of the invention.

FIG. 12 is a screenshot of a user interface 1200 of a system, such as system 1100, for providing configuration details for developing the user interfaces of the J2EE applications using the user experience factory, in accordance with an exemplary embodiment of the invention.

A menu 1202 enables the application developers to specify the second framework corresponding to the J2EE applications. Also, information corresponding to the backing beans and the configuration details may be specified in tables 1204 and 1206, respectively.

In case details corresponding to the resource bundle of the J2EE applications need to be specified, the application developers may check a checkbox 1208. Accordingly, the base name and the variable name of the resource bundle may be specified using textboxes 1210.

Thus, a presentation layer for the J2EE applications, such as presentation layer 102, may be generated by using a software factory such as software factory 310.

Figure 13A:
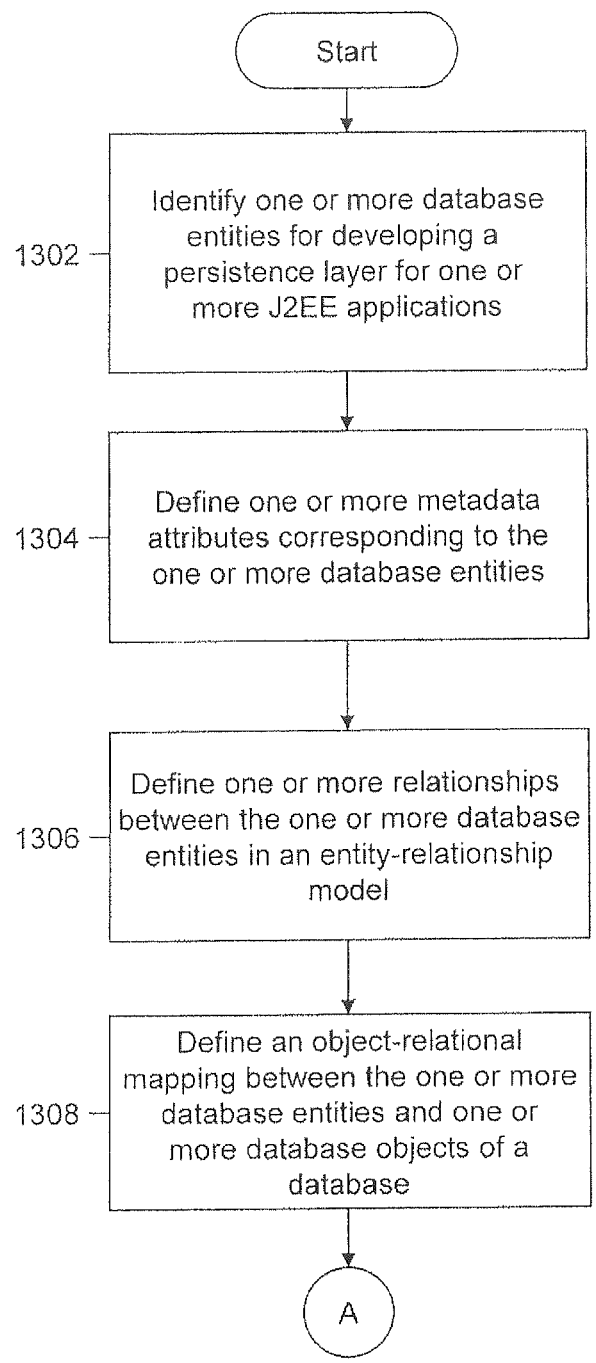
FIG. 13A and FIG. 13B illustrate a flowchart of a method for creating a persistence factory developing a persistence layer for one or more J2EE applications, in accordance with an embodiment of the invention.
Figure 13B:
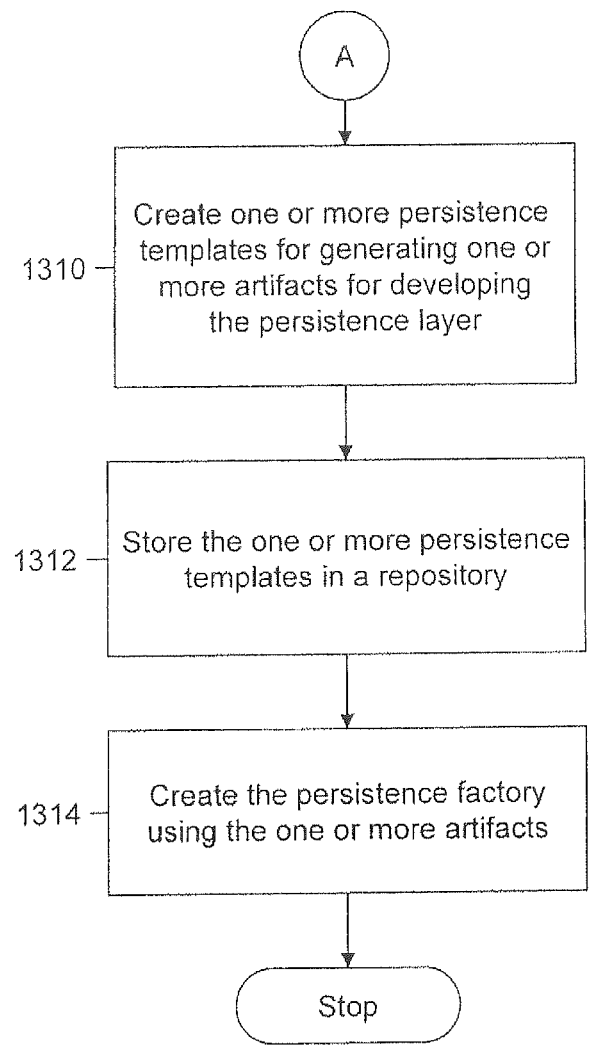

FIG. 13A and FIG. 13B illustrate a flowchart of a method for creating a persistence factory for developing a persistence layer for the J2EE applications, in accordance with an embodiment of the invention.

At 1302, one or more database entities for developing the persistence layer are identified. At 1304, one or more metadata attributes corresponding to the database entities are defined. For example, if a database entity is defined as 'Product', the metadata attributes corresponding to the database entity may be defined as 'Product identification number', 'Product name' and 'Price'.

At 1306, one or more relationships are defined between the database entities in an entity relationship model. For example, a one-to-many relationship may be defined between two database entities such as 'Customer' and 'Customer order' indicating that a customer may place orders for one or more products. Further, at 1308, an object-relational mapping may be defined between the database entities and one or more database objects of a database. For example, the database entity 'Customer' may be mapped to a database object such as a table. Accordingly, a metadata attribute such as 'Customer identification number' that corresponds to the database entity may be mapped to a column of the table.

At 1310, one or more persistence templates are created for generating one or more artifacts, such as artifacts 302*d*, for developing the persistence layer. The persistence templates may be created based on predefined architectures and coding conventions. The artifacts may include one or more configuration files such as configuration files 302*c*, XML files, and text files required for generating the persistence layer. At 1312, the persistence templates are stored in a repository so that they may be reused at a later stage. Subsequently, at 1314, the persistence factory is created using the persistence templates, the database entities, and the object-relational mapping.

The application developers may use the persistence factory for generating the persistence layer for the J2EE applications. One or more persistence templates may be used for generating the artifacts corresponding to the persistence layer. Further, the application developers may define implementation-specific details for the database entities as an input to the persistence factory. For example, the application developers may define a persistence technology for the J2EE applications, such as Hibernate, iBatis and Spring. One or more framework-specific relationships between the database entities may also be defined. In other words, the relationships between database entities may differ across different frameworks of the J2EE applications and may need to be defined by the application developers. Subsequently, the persistence layer may be generated using the generated artifacts, the database entities, and the object relational mapping.

In an embodiment of the invention, the database entities and the object-relational mapping may be provided as an input to the persistence factory by the application developers while developing the J2EE applications. In another embodiment of the invention, a Domain-Specific Language (DSL) may be defined for enabling the application developers to define the database entities and the object-relational mapping. Accordingly, a DSL editor, including the syntax and the semantics of the DSL, may be created. The application developers may use the DSL editor to define the database entities and the object-relational mapping in a DSL file. Subsequently, the persistence layer for the J2EE applications may be created using the inputs from the DSL file and the persistence templates.

In various embodiments of the invention, the persistence templates may include static information corresponding to a coding framework, for example, class and method declarations and static properties of objects. The inputs from the DSL file may be merged with the persistence templates for generating the J2EE applications.

In an embodiment of the invention, the DSL file may be hard coded by the application developers. In another embodiment of the invention, the application developers may connect to a database for fetching information related to the persistence layer of the J2EE applications to define the DSL file. For example, the application developers may connect to a database through Java Database Connectivity (JDBC) and fetch the details corresponding to one or more tables along with the corresponding columns and entity attributes. Thereafter, the application developers may customize the information according to the J2EE applications and generate the DSL file.

Figure 14:
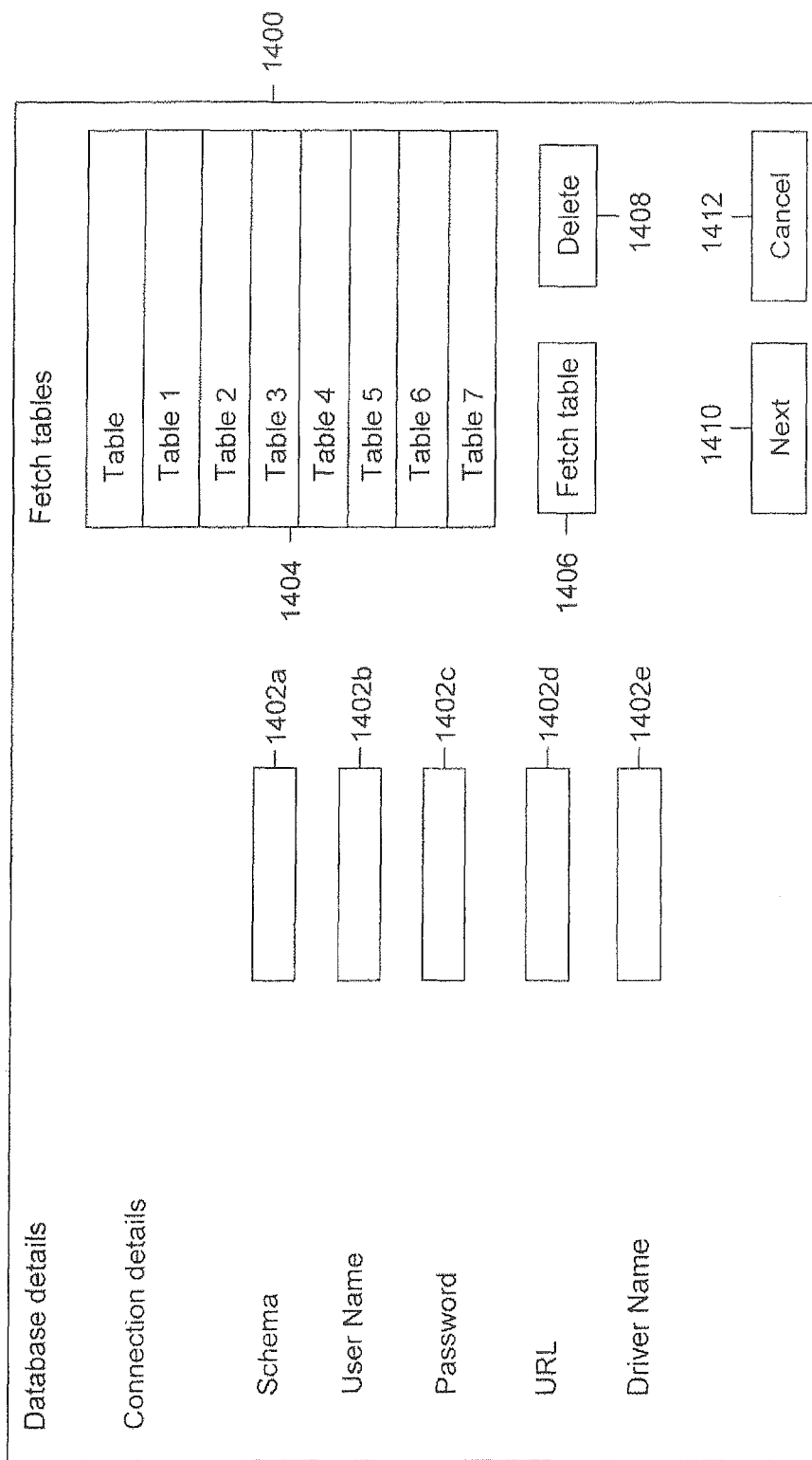
FIG. 14 is a block diagram of a system for defining database connection details for generating a Domain-Specific Language (DSL) file, in accordance with another embodiment of the invention.

FIG. 14 is a block diagram of a system 1400 for defining database connection details for generating the DSL file, in accordance with another embodiment of the invention.

System 1400 includes a plurality of textboxes such as textboxes 1402*a*, 1402*b*, 1402*c*, 1402*d* and 1402*e*, hereinafter referred to as textboxes 1402; a table 1404; and a plurality of buttons such as a fetch table button 1406, a delete button 1408 and a next button 1410 and a cancel button 1412.

Connection details of the database from which persistence layer information relevant to the J2EE application is extracted may be defined by the application developers in textboxes 1402. For example, the name of the database schema may be defined in textbox 1402*a*. Similarly, the username and password for accessing the schema may be entered in textbox 1402*b* and 1402*c*, respectively. In addition, the URL of the database server and the name of a driver, such as a JDBC driver, for connecting to the URL may be defined in textbox 1402*d* and textbox 1402*e*, respectively.

The application developers may click on fetch table button 1406 to fetch a list of all the tables present in the database. The list of tables is then reflected in table 1404. In case data corresponding to one or more tables relevant to the persistence layer of the J2EE applications is required, the application developers may delete the irrelevant tables from table 1404 by clicking on delete button 1408. Subsequently, the applications developers may click on next button 1410 to fetch the details corresponding to the specified tables.

Figure 15:
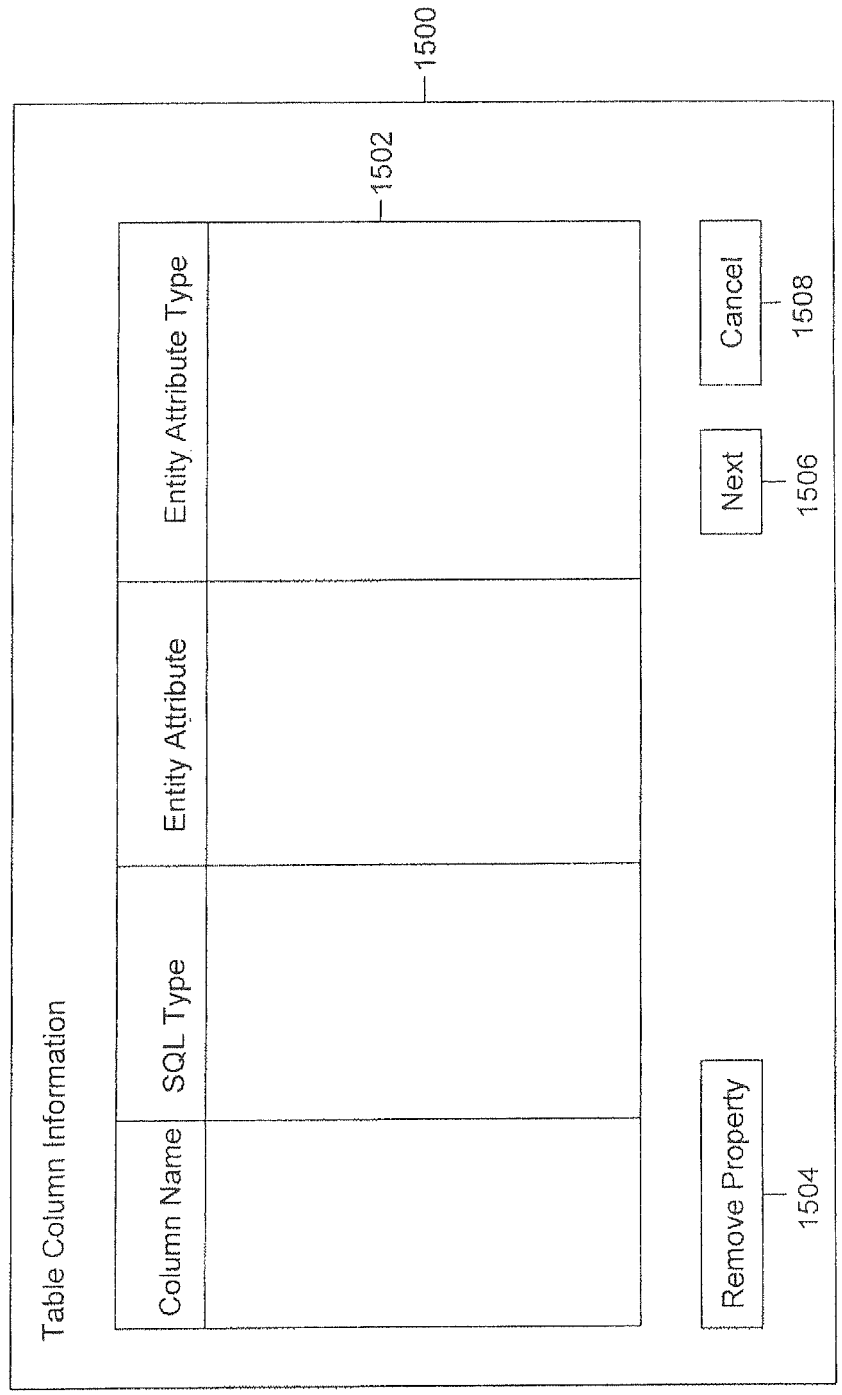
FIG. 15 is a block diagram of a system for defining an object-relational mapping between one or more database entities and one or more database objects, in accordance with yet another embodiment of the invention.

FIG. 15 is a block diagram of a system 1500 for defining an object-relational mapping between the database entities and one or more database objects, in accordance with yet another embodiment of the invention. System 1500 includes a table 1502, a plurality of buttons such as a remove property button 1504, a next button 1506, and a cancel button 1508.

The information corresponding to the tables specified by the application developers using system 1400 is reflected in table 1502. The object-relational mapping includes a relationship between the database entities and one or more database objects such as tables. For example, column names and corresponding entity attribute names may be reflected in table 1502. Further, primary keys and Structured Query Language (SQL) type, i.e., data type of the columns, may also be reflected in table 1502.

The application developers may remove a row containing details corresponding to a column by clicking on remove property button 1504. Also, the application developers may modify the object-relational mapping reflected in table 1502 according to the J2EE applications to be developed. Subsequently, the application developers may save the details fetched from the database and define configuration details for generating the DSL file by clicking on next button 1506.

Figure 16:
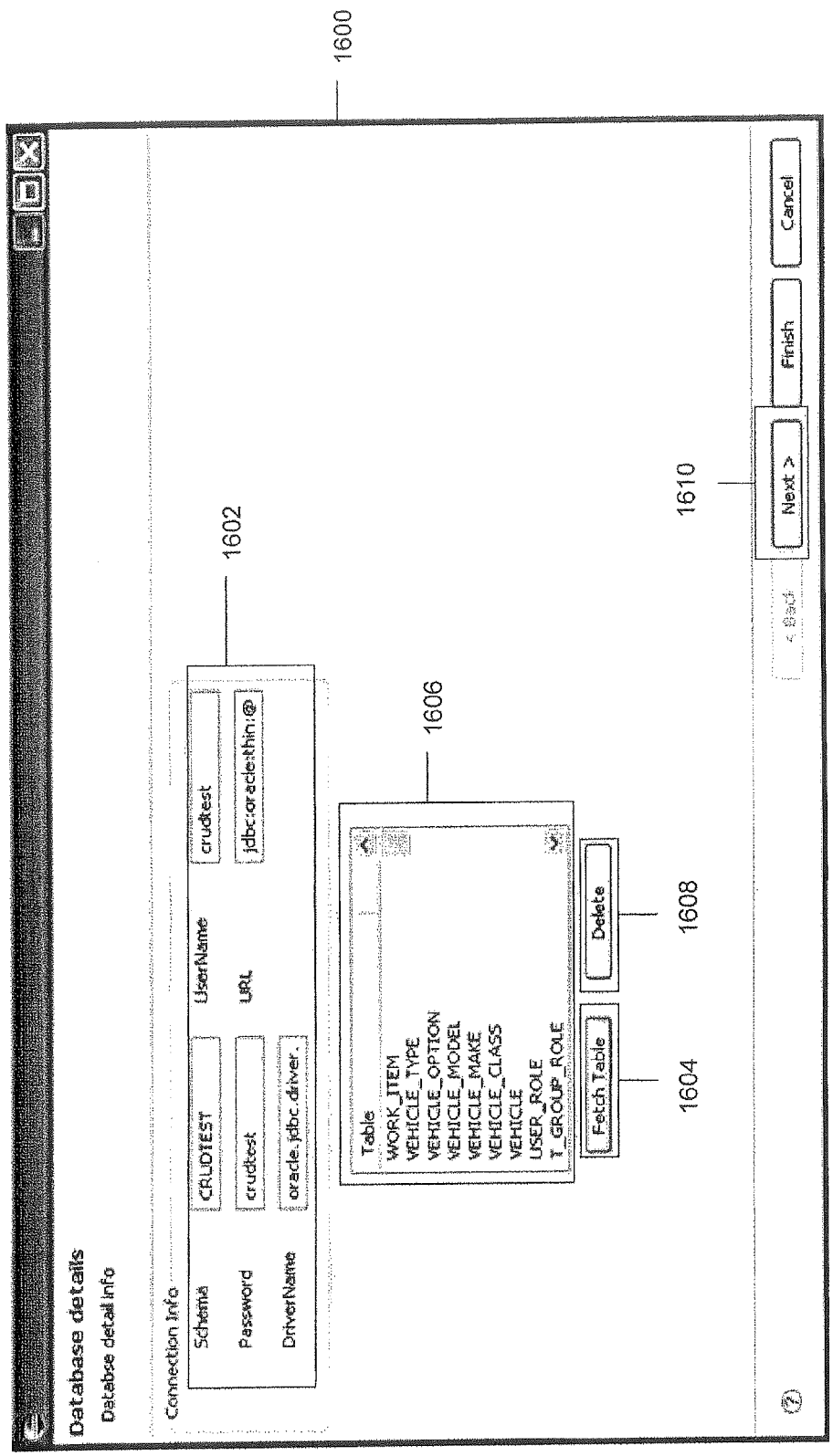
FIG. 16 is a screenshot of a user interface of a system for defining database connection details for generating the DSL file, in accordance with an exemplary embodiment of the invention.

FIG. 16 is a screenshot of a user interface 1600 of a system, such as system 1400, for defining database connection details for generating the DSL file, in accordance with an exemplary embodiment of the invention.

The connection details for the database may be specified by the application developers using textboxes 1602. When the application developers click on a button 1604, the list of all tables in the database is reflected in a table 1606. One or more tables may then be selected by the application developers by removing irrelevant tables by clicking on a delete button 1608. Further, the details corresponding to the selected tables may be fetched from the database by clicking on a next button 1610.

Figure 17:
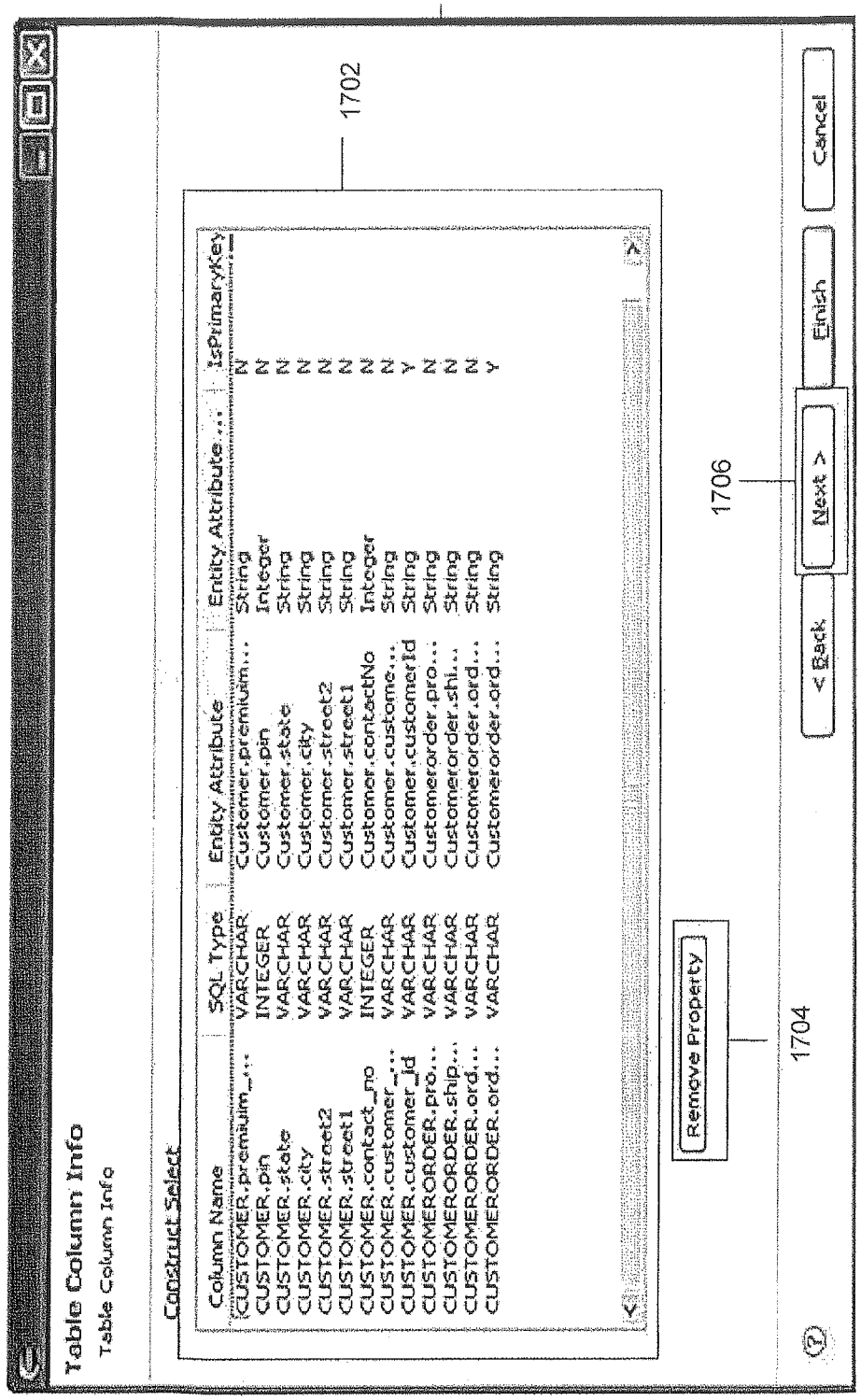
FIG. 17 is a screenshot of a user interface of a system for defining an object-relational mapping between one or more database entities and one or more database objects, in accordance with another exemplary embodiment of the invention.

FIG. 17 is a screenshot of a user interface 1700 of a system, such as system 1500, for defining the object-relational mapping between the database entities and the database objects, in accordance with another exemplary embodiment of the invention. The object-relational mapping fetched from the database is reflected in a table 1702. One or more rows including details of irrelevant columns may be deleted by the application developers by clicking on a button 1704.

Thereafter, configuration details for generating the DSL file mapping may be defined by clicking on a next button 1706.

In another embodiment of the invention, the application developers may hard code the DSL without connecting to a database for fetching the persistence information.

Figure 18:
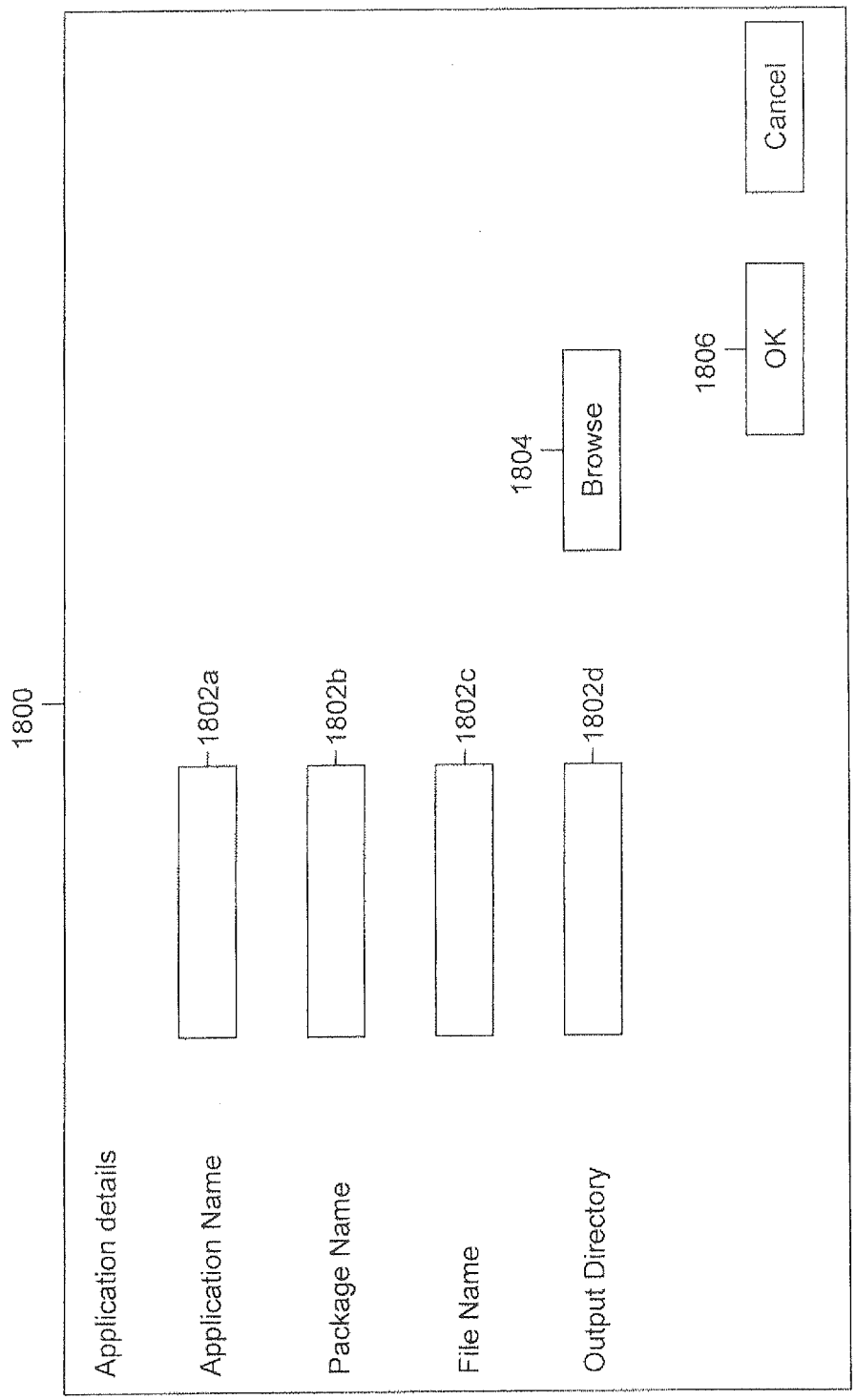
FIG. 18 is a block diagram of a system for defining configuration details for generating the DSL file, in accordance with an embodiment of the invention.

FIG. 18 is a block diagram of a system 1800 for defining the configuration details for generating the DSL file, in accordance with an embodiment of the invention.

System 1800 includes a plurality of textboxes such as textbox 1802a, 1802b, 1802c and 1802d, hereinafter referred to as textboxes 1802; and a plurality of buttons such as a browse button 1804; and an OK button 1806.

System 1800 enables the application developers to specify configuration details in textboxes 1802 for generating the DSL file. The configuration details may include application details such as the name of the DSL file, the J2EE application name, and corresponding packaging details. For example, the name of the J2EE application and the corresponding packaging structure may be specified in textbox 1802a and textbox 1802b, respectively. In another embodiment of the invention, the J2EE application may be generated in the form of an Enterprise Archive (EAR) file, which may be deployed on a J2EE application server for generating the J2EE application. Similarly, the name of the DSL file and the output directory for the DSL file may be specified in textbox 1802c and textbox 1802d, respectively. In various embodiments of the invention, the output directory of the DSL file corresponds to the directory in which the DSL file is generated. The output directory may be selected by clicking on browse button 1804. The DSL file may be generated by clicking on OK button 1806.

Figure 19:
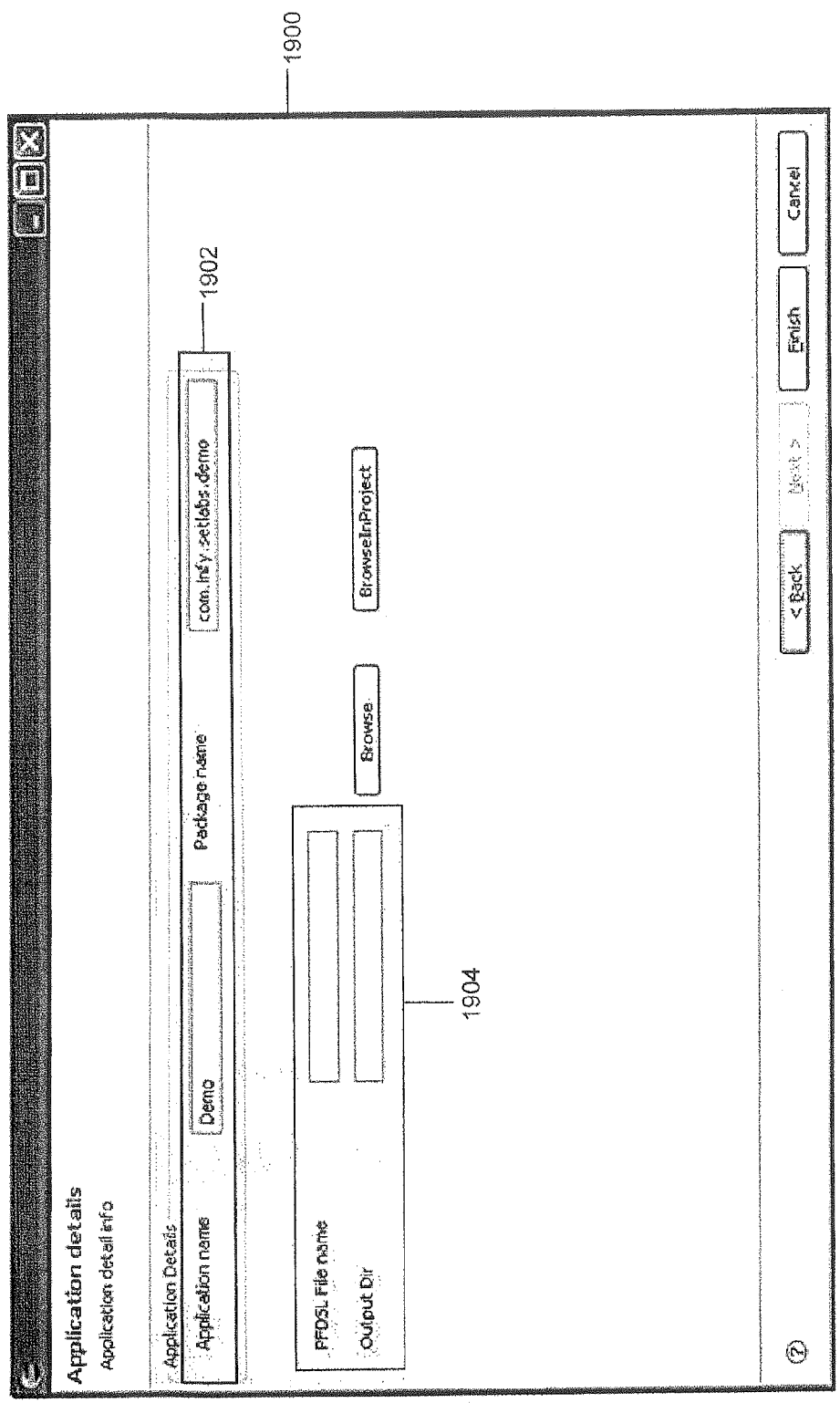
FIG. 19 is a screenshot of a user interface of a system for defining the configuration details for generating the DSL file, in accordance with an exemplary embodiment of the invention.

FIG. 19 is a screenshot of a user interface 1900 of a system, such as system 1800, for defining the configuration details for generating the DSL file, in accordance with an exemplary embodiment of the invention. The application name and corresponding package name may be specified in textboxes 1902. Further, other configuration details, such as the name of the DSL file and the output directory, may be specified in textboxes 1904.

FIG. 20 is a screenshot of an IDE 2000, including an exemplary DSL file, in accordance with an embodiment of the invention.

The DSL file may include one or more database entities and corresponding metadata attributes. Further, the DSL file may include one or more relationships between the database entities and the object-relational mapping between the database entities and the database objects. In an embodiment of the invention, the DSL file may be hard coded by the application developers.

In another embodiment of the invention, the DSL file may be generated by fetching persistence information from the database. Subsequently, the application developers may customize the DSL file according to the J2EE application to be developed. For example, the application developers may define one or more framework-specific relationships between the database entities. Further, the application developers may add constraints to one or more database objects defined in the DSL file. For example, a primary key attribute may be added to a table defined in the DSL file.

Thereafter, one or more artifacts corresponding to the J2EE application may be generated by using the persistence templates of the persistence factory. The artifacts may include one or more configuration files, text files, and XML files required to generate the persistence layer. Subsequently, a persistence layer for the J2EE application is generated using the artifacts and the inputs from the DSL file.

Figure 21:
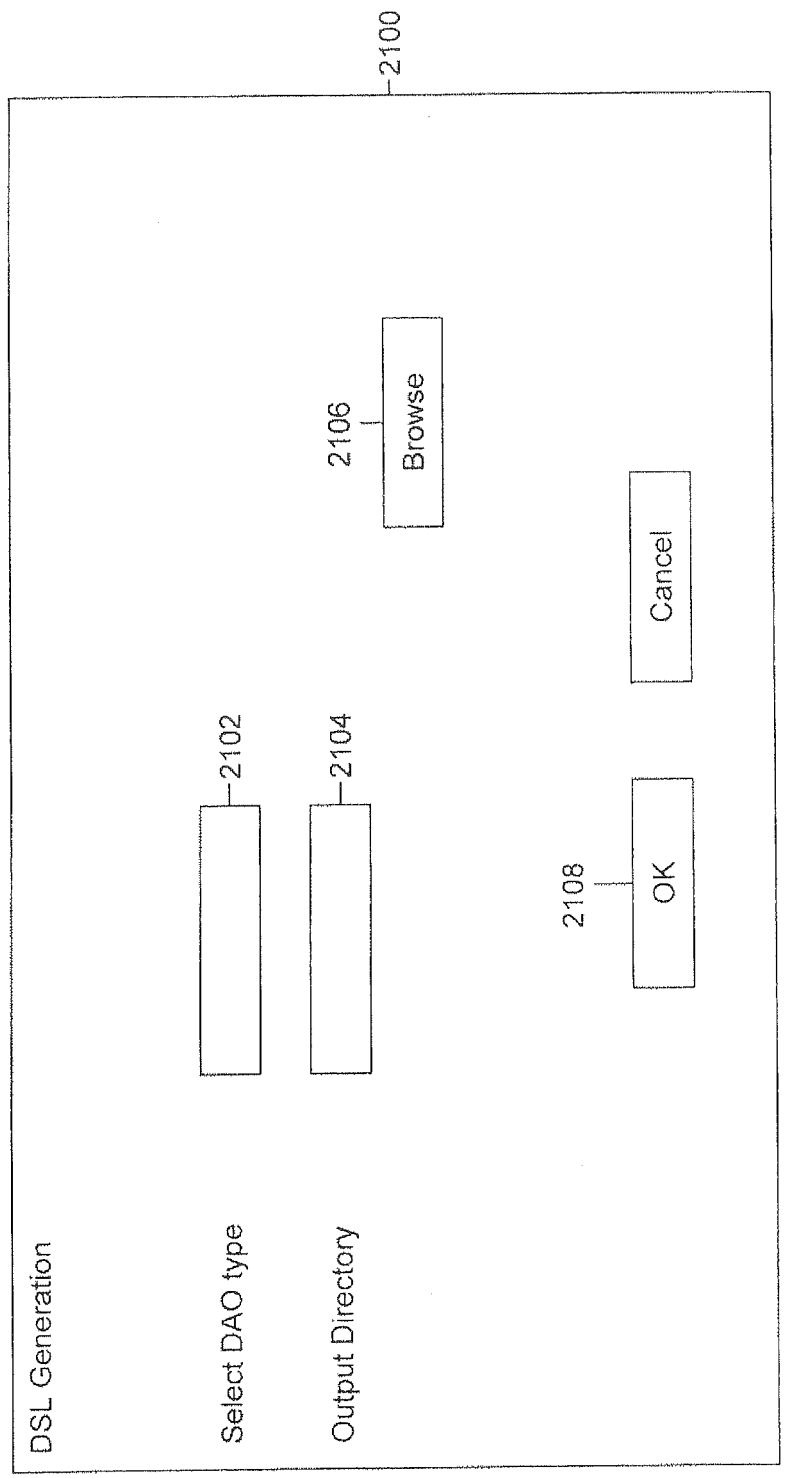
FIG. 21 is a block diagram of a system for defining implementation-specific details for generating the persistence layer for the J2EE applications, in accordance with another embodiment of the invention.

FIG. 21 is a block diagram of a system 2100 for defining implementation-specific details for generating the persistence layer for the J2EE applications, in accordance with another embodiment of the invention. System 2100 includes a menu 2102, a textbox 2104, and a plurality of buttons such as a browse button 2106 and an exemplary OK button.

A type of data access object (DAO) corresponding to the data access layer of the J2EE applications, such as data access layer 106, may be defined using menu 2102. In an exemplary embodiment of the invention, the DAO object may be defined as Hibernate. In another exemplary embodiment of the invention, the DAO object may be defined as iBatis.

The name of an output directory corresponding to the J2EE application may be defined in textbox 2104. The output directory may be selected by clicking browse button 2106. In an embodiment of the invention, the output directory may refer to the directory in which the EAR file corresponding to the J2EE application is generated. Subsequently, the persistence layer for the J2EE application may be generated by clicking on OK button 2108.

Figure 22:
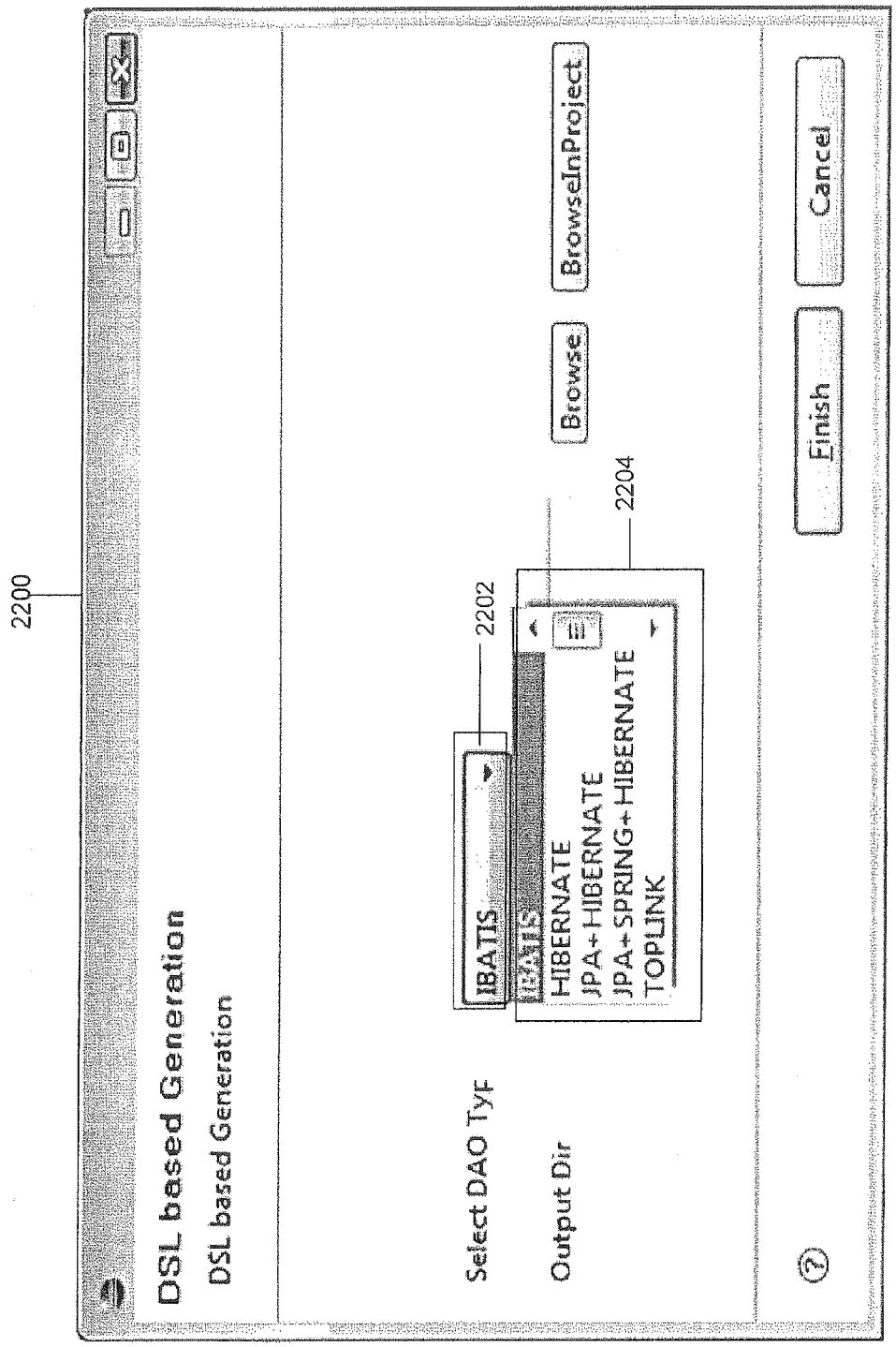
FIG. 22 is a screenshot of a user interface of a system for defining implementation-specific details for generating the persistence layer for the J2EE applications, in accordance with an exemplary embodiment of the invention.

FIG. 22 is a screenshot of a user interface 2200 of a system, such as system 2100, for defining implementation-specific details for generating the persistence layer for the J2EE applications, in accordance with an exemplary embodiment of the invention.

User interface 2200 includes a textbox 2202 for enabling the application developers to define the type of DAO specific to the J2EE application. Similarly, the output directory corresponding to the J2EE application may be defined from a list of names reflected in a menu 2204.

As the application developers define only the database entities, the object relational mapping and the implementation-specific details for generating the persistence layer, the J2EE applications is developed much faster as compared with the solutions known in the art.

In various embodiments of the present invention, the application developers are required to identify the artifacts for developing the J2EE applications. The artifacts are generated by using one or more templates stored in the repository. The artifacts may be integrated through the integration mechanism and may be generated corresponding to any framework, for example, HTML, JSF, Struts, and Ice-Faces. Also, a new template may be created and stored in the repository to enable its subsequent reuse which avoids any repetition of work. In addition, an artifact corresponding to a framework, such as JSF, may be converted into any other framework such as HTML. Therefore, the J2EE applications can be developed with a significant reduction in the amount of effort required.

The method for developing the J2EE applications using a factory, such as a software factory, a user experience factory, and a persistence factory, as described in the present invention, may be embodied in the form usable through a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit, and the Internet. The computer further comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive, an optical disk drive, etc. The storage device can also be other similar means for loading computer programs or other instructions into the computer system. The computer system also includes a communication unit, which enables the computer to connect to other databases and the Internet through an Input/Output (I/O) interface. The communication unit also enables the transfer as well as reception of data from other databases. The communication unit may include a modem, an Ethernet card, or any similar device which enable the computer system to connect to databases and networks such as Local Area Network (LAN), Metropolitan Area Network (MAN), Wide Area Network (WAN), and the Internet. The computer system facilitates inputs from a user through an input device, accessible to the system through an I/O interface.

The computer system executes a set of instructions that are stored in one or more storage elements, in order to process the input data. The storage elements may also hold data or other information as desired. The storage element may be in the form of an information source or a physical memory element present in the processing machine.

The present invention may also be embodied in a computer program product for developing the J2EE applications. A software factory, a user experience factory and a persistence factory may also be embodied in a computer program product. The computer program product includes a computer usable medium having a set program instructions comprising a program code for developing the J2EE applications using the factory. The set of instructions may include various commands that instruct the processing machine to perform specific tasks such as the steps that constitute the method of the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention, as described in the claims.

The invention claimed is:

1. A method for creating a user experience factory for developing one or more user interfaces for one or more Java 2 Platform, Enterprise Edition (J2EE) applications, the method comprising:

identifying one or more user experience components for generating the one or more user interfaces;

creating one or more user interface templates for generating the one or more user experience components, wherein the one or more user interface templates are stored in a repository;

defining a user experience factory schema comprising one or more relationships between the one or more user experience components, wherein defining the user experience factory schema comprises receiving an indication of a user interface component and an indication of a backing bean corresponding to the user interface component; and creating the user experience factory for developing the one or more user interfaces for the one or more Java 2 Platform, Enterprise Edition (J2EE) applications using the user experience factory schema and the one or more user interface templates, wherein the created user experience factory comprises a graphical user interface for developing the one or more user interfaces for the one or more Java 2 Platform, Enterprise Edition (J2EE) applications and the indication of the backing bean;

wherein a first user interface component of a first framework is provided as an input to the one or more user interface templates for developing the one or more J2EE applications, the one or more J2EE applications being developed based on static information corresponding to the first user interface component;

wherein a second framework is defined, and the second framework corresponds to the one or more J2EE applications; and wherein the first user interface component of the first framework is converted to a second user interface component of the second framework using the user experience factory.

2. The method according to claim 1, further comprising: storing the one or more user experience components in the repository.

3. The method according to claim 1 further comprising: providing a set of dynamic information as an input to the user experience factory, wherein the set of dynamic information corresponds to the second framework.

4. The method according to claim 3, wherein the set of dynamic information is stored in one or more application model classes.

5. The method according to claim 4, further comprising: converting the one or more application model classes into an Extensible Markup Language (XML) format before providing the set of dynamic information as an input to the user experience factory.

6. The method according to claim 3, wherein the one or more user interfaces of the one or more J2EE applications are developed using the set of dynamic information and at least one of the one or more user interface templates and the one or more user experience components.

7. A computer program product comprising a user experience factory for use in a business establishment, the computer program product further comprising a non-transitory computer usable medium having a computer readable program code embodied therein for developing one or more user interfaces for one or more Java 2 Platform, Enterprise Edition (J2EE) applications, the computer readable program code performing:

receiving, by the user experience factory, identification of one or more first user interface components related to a first framework;

receiving, by the user experience factory, a definition of a second framework, wherein the second framework corresponds to the one or more J2EE applications and the second framework definition comprises an HTML user interface component and a backing bean value for the HTML user interface component, wherein the user experience factory receives a set of dynamic information specific to the second framework;

converting, by the user experience factory, the one or more first user interface components to one or more second user interface components using one or more user interface templates stored in a repository, wherein the one or more second user interface components correspond to the second framework; and providing, by the user experience factory, the one or more second user interface components during development of the one or more user interfaces for the one or more J2EE applications;

wherein the user experience factory comprises a graphical user interface for developing the one or more user interfaces for the one or more Java 2 Platform, Enterprise Edition (J2EE) applications and is based on a user experience factory schema definition and one or more user interface templates for generating one or more user experience components, wherein the one or more user interface templates are stored in a repository.

8. The computer program product according to claim 7, wherein the computer readable program code further performs:

receiving a set of dynamic information as an input to the user experience factory for generating the one or more J2EE applications, wherein the set of dynamic information corresponds to the second framework.

9. The computer program product according to claim 8, wherein the computer readable program code further performs storing the set of dynamic information in one or more application model classes.

10. The computer program product according to claim 9, wherein the computer readable program code further performs converting data in the one or more application model classes into an Extensible Markup Language (XML) format before providing the set of dynamic information as an input to the user experience factory.

11. The method of claim 1, wherein the backing bean corresponds to a table user interface component.

12. The method of claim 1, wherein the user interface templates are based on coding conventions.

13. The method of claim 1, further comprising:

receiving edits to a domain-specific file of a defined domain-specific language, wherein the domain-specific language comprises syntax and semantics.

14. The method of claim 13 further comprising:

receiving database entities and object-relational mapping as input to a persistence factory, wherein the database entities and object-relational mapping are defined according to the domain-specific language and stored in the domain-specific file; and creating a persistence layer for the J2EE applications using the database entities and object-relational mapping as stored in the domain-specific file.

15. A computer system comprising:

memory;

a microprocessor;

wherein the memory comprises computer-executable instructions causing the computer system to perform a method of creating a user experience factory for developing one or more user interfaces for one or more Java 2 Platform, Enterprise Edition (J2EE) applications, the method comprising:

receiving identification of one or more user experience components for generating the one or more user interfaces;

receiving one or more user interface templates for generating the one or more user experience components;

storing the one or more user interface templates in a repository;

receiving a user experience factory schema definition comprising one or more relationships between the one or more user experience components, wherein the user experience factory schema definition comprises an indication of a table user interface component and a backing bean corresponding to the table user interface component;

creating the user experience factory using the user experience factory schema definition and the one or more user interface templates, wherein the user experience factory comprises the backing bean, and wherein the user experience factory has a graphical user interface for developing the one or more user interfaces for the one or more Java 2 Platform, Enterprise Edition (J2EE) applications, wherein creating the user experience factory comprises:

integrating one or more page layouts into workflows that enable user navigation of the Java 2 Platform, Enterprise Edition applications, and integrating the workflows into a user interface experience;

wherein a first user interface component of a first framework is provided as an input to the one or more user interface templates for developing the one or more J2EE applications, the one or more J2EE applications being developed based on static information corresponding to the first user interface component;

wherein a second framework is defined and corresponds to the one or more J2EE applications; and wherein the first user interface component of the first framework is converted to a second user interface component using the user experience factory, and the second user interface component is of the second framework.

16. The computer system of claim 15, wherein the method of creating a user experience factory further comprises:

providing a set of dynamic information as an input to the user experience factory, wherein the set of dynamic information corresponds to the second framework.

17. The computer system of claim 16, wherein the set of dynamic information is stored in one or more application model classes.

18. The computer system of claim 17, wherein the method of creating a user experience factory further comprises:

converting the one or more application model classes into an Extensible Markup Language (XML) format before providing the set of dynamic information as an input to the user experience factory.

19. The computer system of claim 16, wherein the one or more user interfaces of the one or more J2EE applications are developed using the set of dynamic information and at least one of the one or more user interface templates and the one or more user experience components.

20. The computer system of claim 15, wherein the one or more user interfaces for the one or more Java 2 Platform, Enterprise Edition (J2EE) applications form a presentation layer for the applications.

* * * * *

UNITED STATES PATENT AND TRADEMARK OFFICE
CERTIFICATE OF CORRECTION

PATENT NO. : 9,886,248 B2
APPLICATION NO. : 14/667065
DATED : February 6, 2018
INVENTOR(S) : Doddavula et al.

Page 1 of 1

It is certified that error appears in the above-identified patent and that said Letters Patent is hereby corrected as shown below:

On the Title Page

The following should be added:
(30) Foreign Application Priority Data
Jan. 7, 2009 (IN) ............................46/CHE/2009

Signed and Sealed this
Fourth Day of September, 2018

Andrei Iancu
*Director of the United States Patent and Trademark Office*